US012602429B2

(12) United States Patent
Kharbanda et al.

(10) Patent No.: US 12,602,429 B2
(45) Date of Patent: Apr. 14, 2026

(54) VIDEO AND AUDIO MULTIMODAL SEARCHING SYSTEM

(71) Applicant: Google LLC, Mountain View, CA (US)

(72) Inventors: Harshit Kharbanda, Pleasanton, CA (US); Belinda Luna Zeng, Cupertino, CA (US); Viviana Caso Corella, San Francisco, CA (US); Aashi Jain, Sunnyvale, CA (US); David William Hendon, Oakland, CA (US); Christopher James Kelley, Orinda, CA (US); Jessica Lee, Brooklyn, NY (US); Dounia Berrada, Saratoga, CA (US); Kai Yu, San Francisco, CA (US); Louis Wang, San Francisco, CA (US); Thomas J. Duerig, Mountain View, CA (US); Radu Soricut, Manhattan Beach, CA (US); Robin Dua, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 214 days.

(21) Appl. No.: 18/326,496

(22) Filed: May 31, 2023

(65) Prior Publication Data

US 2024/0403362 A1     Dec. 5, 2024

(51) Int. Cl.
*G06T 7/70* (2017.01)
*G06F 16/732* (2019.01)
(Continued)

(52) U.S. Cl.
CPC .......... *G06F 16/735* (2019.01); *G06F 16/732* (2019.01); *G06F 16/7834* (2019.01);
(Continued)

(58) Field of Classification Search
CPC .. G06F 16/735; G06F 16/732; G06F 16/7834; G06F 16/7328; G06F 16/787;
(Continued)

(56) References Cited

U.S. PATENT DOCUMENTS

| 11,636,291 B1 | 4/2023 | Zuo et al. | |
| 2017/0235828 A1* | 8/2017 | Philipose ........... | H04N 21/2665 |
| | | | 725/115 |

(Continued)

OTHER PUBLICATIONS

Chen et al., "MM-VIT: Multi-Modal Video Transformer for Compressed Video Action Recognition", arXiv:2108.09322v2, Nov. 12, 2021, 12 pages.

(Continued)

*Primary Examiner* — Stephen P Coleman
(74) *Attorney, Agent, or Firm* — DORITY & MANNING P.A.

(57) ABSTRACT

A multimodal search system using a video query is described. The system can receive video data captured by a camera of a user device. The video data can have a sequence of image frames. Additionally, the system can receive audio data associated with the video data captured by the user device. Moreover, the system can process, using one or more machine-learned models, the sequence of image frames to generate video embeddings related to the sequence of the image frames. The video embeddings can have a plurality of image embeddings associated with the sequence of image frames. Furthermore, the system can determine one or more video results based on the video embeddings and the audio data. Subsequently, the system can transmit, to the user device, the one or more video results.

24 Claims, 12 Drawing Sheets

(51) Int. Cl.

| | |
|---|---|
| *G06F 16/735* | (2019.01) |
| *G06F 16/783* | (2019.01) |
| *G06V 10/62* | (2022.01) |
| *G06V 10/774* | (2022.01) |
| *G06V 20/40* | (2022.01) |
| *G06V 10/82* | (2022.01) |
| *G10L 15/26* | (2006.01) |

(52) U.S. Cl.

CPC ............... *G06T 7/70* (2017.01); *G06V 10/62* (2022.01); *G06V 10/774* (2022.01); *G06V 20/46* (2022.01); *G06T 2207/10016* (2013.01); *G06T 2207/20081* (2013.01); *G06T 2207/20084* (2013.01); *G06T 2207/30244* (2013.01); *G06V 10/82* (2022.01); *G06V 2201/07* (2022.01); *G10L 15/26* (2013.01)

(58) Field of Classification Search

CPC . G06F 16/71; G06T 7/70; G06T 2207/10016; G06T 2207/20081; G06T 2207/20084; G06T 2207/30244; G06V 10/62; G06V 10/774; G06V 20/46; G06V 10/82; G06V 2201/07; G10L 15/26

USPC .......................................................... 382/103

See application file for complete search history.

(56) References Cited

U.S. PATENT DOCUMENTS

| | | | | |
|---|---|---|---|---|
| 2020/0401621 | A1* | 12/2020 | Bender | ................. G06F 16/735 |
| 2021/0216778 | A1* | 7/2021 | Ramaswamy | ......... G06V 20/46 |
| 2022/0310113 | A1 | 9/2022 | Tzinis et al. | |
| 2023/0008897 | A1 | 1/2023 | Jiang et al. | |

OTHER PUBLICATIONS

Chen et al., "Multimodal Transformer Distillation for Audio-Visual Synchronization", arXiv:2210.15563v1, Oct. 27, 2022, 5 pages.

Google AI Blog, "ImageBind: Holistic AI Learning Across Six Modalities", May 9, 2023, https://ai.facebook.com/blog/imagebind-six-modalities-binding-ai/, Retrieved on May 31, 2023, 6 pages.

International Search Report and Written Opinion for Application No. PCT/US2024/031999, mailed Oct. 1, 2024, 17 pages.

* cited by examiner

466
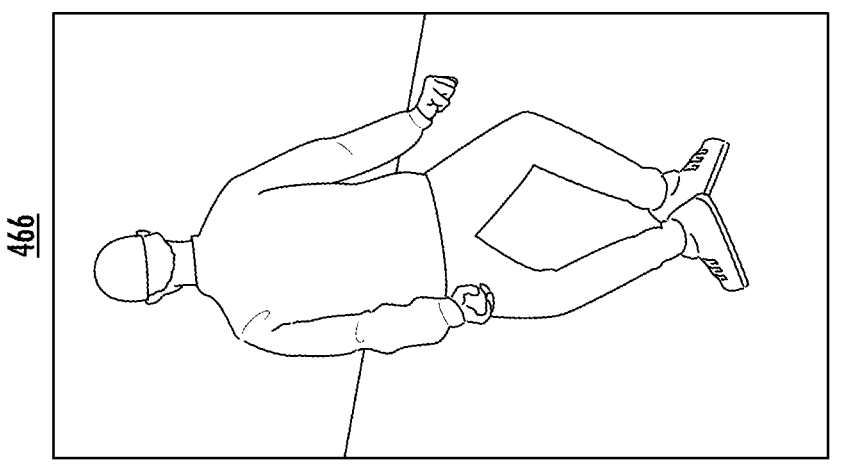
460
SEQUENCE OF IMAGES
464
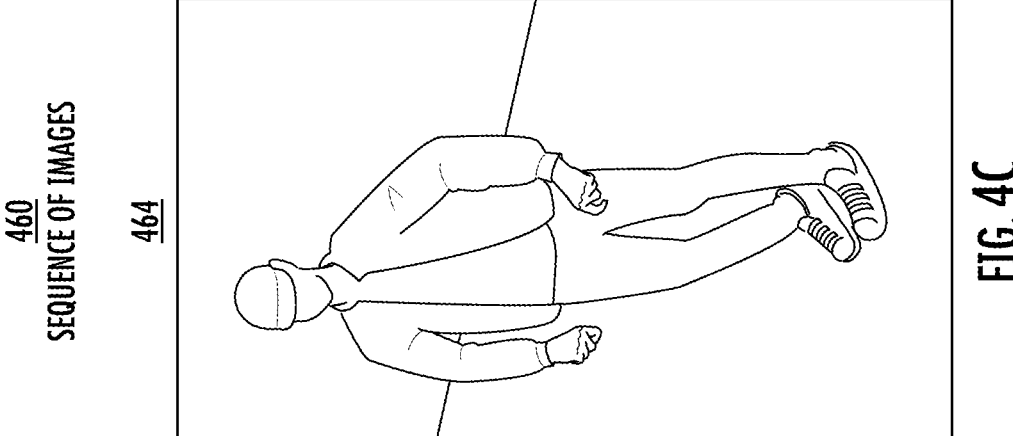
462
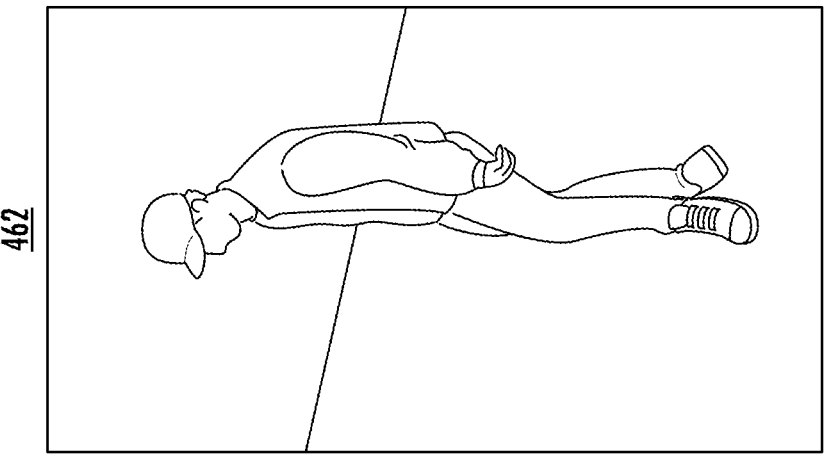
FIG. 4C

480
AR OUTPUT

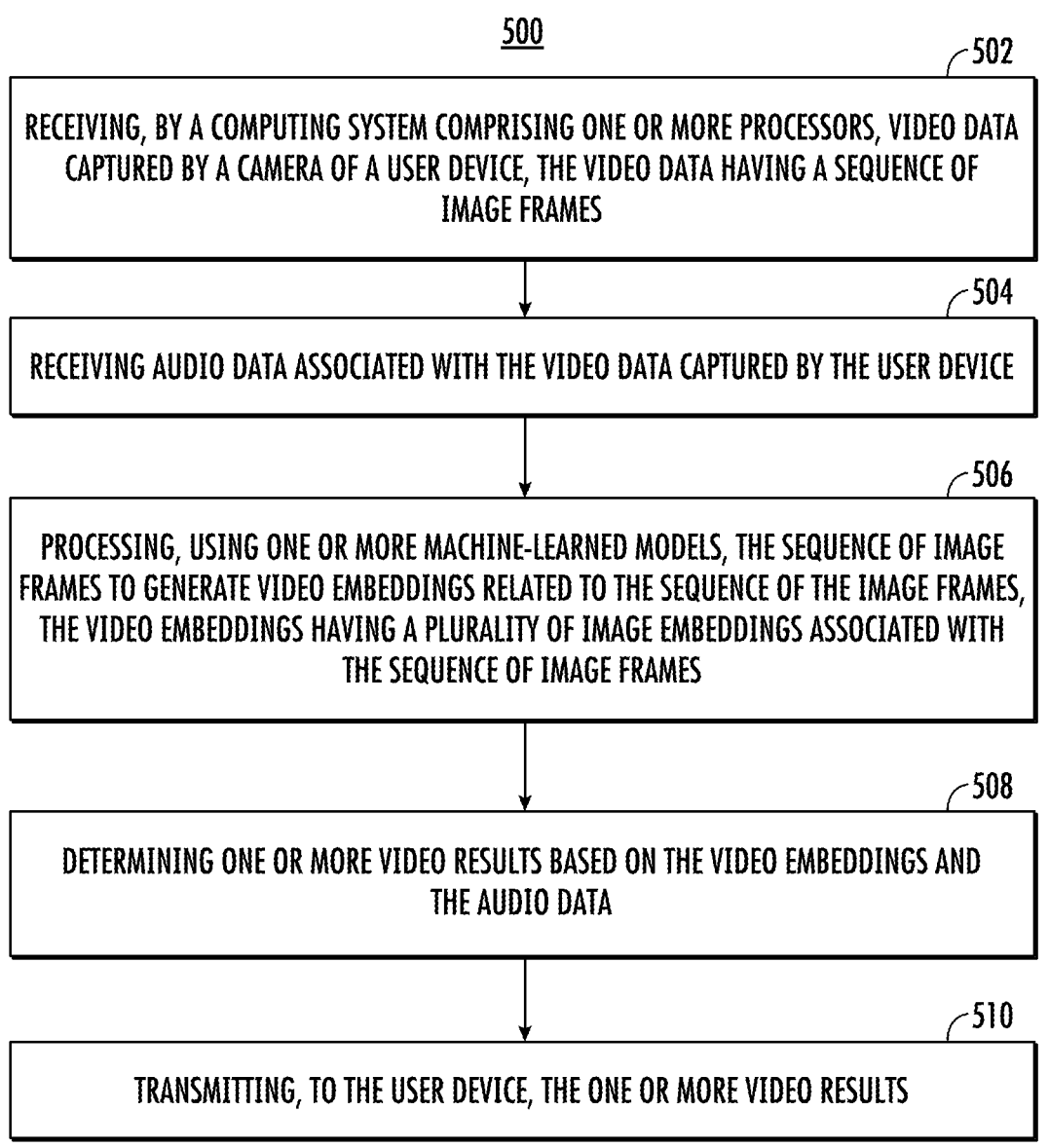

500

502

RECEIVING, BY A COMPUTING SYSTEM COMPRISING ONE OR MORE PROCESSORS, VIDEO DATA CAPTURED BY A CAMERA OF A USER DEVICE, THE VIDEO DATA HAVING A SEQUENCE OF IMAGE FRAMES

504

RECEIVING AUDIO DATA ASSOCIATED WITH THE VIDEO DATA CAPTURED BY THE USER DEVICE

506

PROCESSING, USING ONE OR MORE MACHINE-LEARNED MODELS, THE SEQUENCE OF IMAGE FRAMES TO GENERATE VIDEO EMBEDDINGS RELATED TO THE SEQUENCE OF THE IMAGE FRAMES, THE VIDEO EMBEDDINGS HAVING A PLURALITY OF IMAGE EMBEDDINGS ASSOCIATED WITH THE SEQUENCE OF IMAGE FRAMES

508

DETERMINING ONE OR MORE VIDEO RESULTS BASED ON THE VIDEO EMBEDDINGS AND THE AUDIO DATA

510

TRANSMITTING, TO THE USER DEVICE, THE ONE OR MORE VIDEO RESULTS

FIG. 5

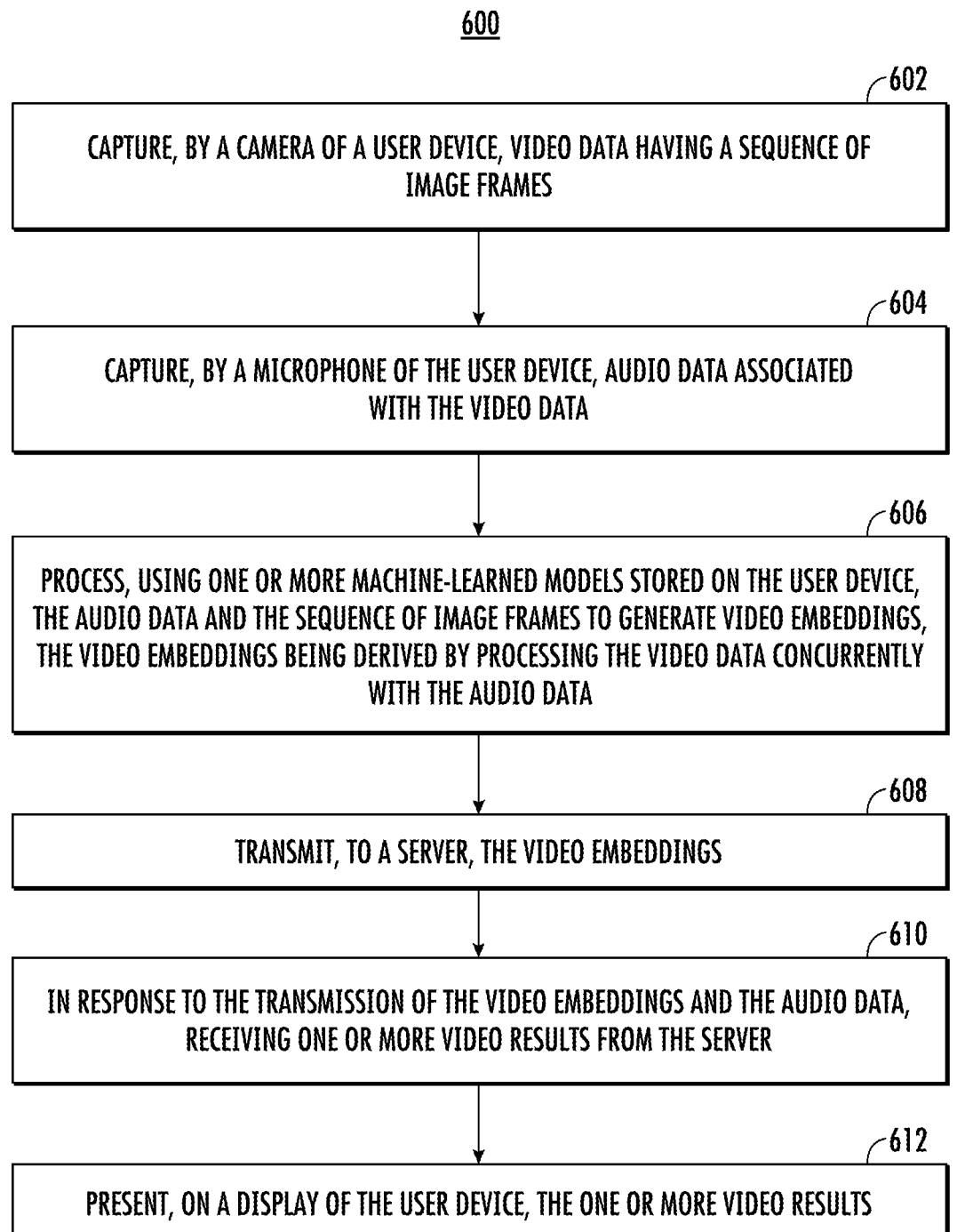

600

602
CAPTURE, BY A CAMERA OF A USER DEVICE, VIDEO DATA HAVING A SEQUENCE OF IMAGE FRAMES

604
CAPTURE, BY A MICROPHONE OF THE USER DEVICE, AUDIO DATA ASSOCIATED WITH THE VIDEO DATA

606
PROCESS, USING ONE OR MORE MACHINE-LEARNED MODELS STORED ON THE USER DEVICE, THE AUDIO DATA AND THE SEQUENCE OF IMAGE FRAMES TO GENERATE VIDEO EMBEDDINGS, THE VIDEO EMBEDDINGS BEING DERIVED BY PROCESSING THE VIDEO DATA CONCURRENTLY WITH THE AUDIO DATA

608
TRANSMIT, TO A SERVER, THE VIDEO EMBEDDINGS

610
IN RESPONSE TO THE TRANSMISSION OF THE VIDEO EMBEDDINGS AND THE AUDIO DATA, RECEIVING ONE OR MORE VIDEO RESULTS FROM THE SERVER

612
PRESENT, ON A DISPLAY OF THE USER DEVICE, THE ONE OR MORE VIDEO RESULTS

FIG. 6

OUTPUT DETERMINATION SYSTEM 80

SEARCH RESULTS INTERFACE 82

ML MODEL OUTPUT INTERFACE 84

AR/VR 86

ACTION PROMPT(S) 88

GENERATIVE MODEL 90

DATA AUGMENTATION 92

DATA STORAGE 94

SENSOR PROCESSING SYSTEM 50 / 60

CONTEXT DETERMINATION 62

IMAGE PREPROCESSING 64

DETECTION MODEL 66

SEGMENTATION MODEL 68

CLASSIFICATION MODEL 70

EMBEDDING MODEL 72

SEARCH ENGINE 74

MULTIMODAL PROCESSING 76

52

VIDEO AND AUDIO MULTIMODAL SEARCHING SYSTEM

FIELD

The present disclosure relates generally to processing video and audio data in a search query to provide search results. More particularly, the present disclosure relates to multimodal searching by processing video embeddings that are extracted from the video data together with a voice command.

BACKGROUND

In conventional systems, search queries can include text input or audio data to search for a particular item or a particular piece of knowledge. However, understanding the context and intent can be difficult when the search request is limited to just text and audio data. In some instances, text and audio data may not be descriptive enough to generate desired results that a user is looking for. Search results that are only based on text or audio data can be limited, because the user is limited by the mode of inputs to express their request. As a result, in conventional systems, when search results are not to the user's satisfaction, the user may post the content to social media or a discussion forum in order to crowdsource the answer from other users.

Video can provide additional insights into the intent of a user through various visual cues and contextual information. For example, contextual information can be derived from visual actions and gestures in the video. However, determining user intent from video is a complex task that often requires computer vision techniques and machine learning algorithms.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for multimodal searching of video results. The method can include receiving, by a computing system comprising one or more processors, video data captured by a camera of a user device. The video data can have a sequence of image frames. Additionally, the method can include receiving audio data associated with the video data captured by the user device. Moreover, the method can include processing, using one or more machine-learned models, the sequence of image frames to generate video embeddings related to the sequence of the image frames. The video embeddings have a plurality of image embeddings associated with the sequence of image frames. Furthermore, the method can include determining one or more video results based on the video embeddings and the audio data. Subsequently, the method can include transmitting, to the user device, the one or more video results.

In some instances, the method can further include processing, using the one or more machine-learned models, the sequence of image frames to generate temporal information related to the sequence of the image frames. The determination of the one or more video results can be further based on the temporal information related to the sequence of the image frames.

In some instances, the method can further include processing, using an automatic speech recognition technique, the audio data to generate a text query. The determination of the one or more video results can be further based on the text query. In some instances, the method can further include processing, using the one or more machine-learned models, the text query and video embeddings concurrently to determine the one or more video results.

In some instances, the processing of the sequence of image frames to generate the video embeddings can include selecting, using a frame selection algorithm, a subset of image frames from the sequence of image frames. Additionally, the method can include processing each image frame in the subset of image frames to generate a plurality of image embeddings. The plurality of image embeddings can have an image embedding for each image frame in the subset of image frames. Moreover, the method can include determining the video embeddings based on the plurality of image embeddings. The video embeddings can be determined by averaging each image embedding in the plurality of image embeddings. The frame selection algorithm can be a uniform random sampling of frames, where the subset of image frames is selected at a regular interval, such as every nth frame. Additionally, or alternatively, the frame selection algorithm can be based on the position of the camera and an orientation of the camera.

In some instances, the processing of the sequence of image frames to generate the video embeddings can include detecting a target object in the video data. Additionally, the frame selection algorithm is based on a spatial relationship between the camera and the target object. Moreover, the spatial relationship can include a translation vector that represents a position of the camera in a three-dimensional space relative to the target object. The translation vector can specify the distance that the camera is displaced with respect to the target object. Moreover, the spatial relationship can include a rotation matrix that represents an orientation of the camera in a three-dimensional space relative to the target object. The orientation matrix can specify the degree of rotation of the camera with respect to the target object.

In some instances, the frame selection algorithm can be running on the user device and the video data received is a subset of images from the sequence of image frames. The video embeddings can be generated by processing the subset of image frames. Additionally, the video embeddings can have temporal information associated with the subset of image frames.

In some instances, the method can include processing the audio data to generate an input audio signature. The determination of the one or more video results can be further based on the input audio signature. Additionally, the determination of the one or more search results can include detecting a target object in the video data. Moreover, the method can include accessing from an audio signature database a plurality of known audio signatures that are associated with the target object. Furthermore the method can include selecting a matching audio signature from the known audio signatures, wherein a comparison score of the matching audio signature exceeds a threshold value. The matching score of the matching audio signature can be calculated by comparing the input audio signature with the matching audio signature. The one or more video results can be further determined based on the matching audio signature.

In some instances, the processing of the sequence of image frames to generate the video embeddings can include processing, using the one or more machine-learned model, each image frame in the sequence of image frames to generate the video embeddings. Additionally, the method can include mapping the generated video embeddings to an index of video embeddings. The one or more video results can be determined based on the mapping of the generated video embeddings to the index of video embeddings. Moreover, the mapping of the generated video embeddings to the index of video embeddings can include ranking each video embedding in the index of video embeddings based on a comparison with the generated video embeddings. Each video embedding can be associated with a video result. The one or more video results can be determined based on the ranking of each video embedding in the index of video embeddings.

In some instances, the one or more machine-learned model can include a polymath model. Additionally, the one or more machine-learned models can be trained using tutorial videos publicly available on an online video sharing platform.

In some instances, the one or more machine-learned model can include a multimodal multitask unified model that is trained to understand information from a plurality of formats, the plurality of formats including video and text.

In some instances, the method can further include determining one or more web results based on the video embeddings. Additionally, the method can include transmitting, to the user device, the one or more web results.

In some instances, the method can further include processing, using the one or more machine-learned models, the audio data with the sequence of image frames to generate video embeddings.

Another example aspect of the present disclosure is directed at a computer-implemented method for multimodal searching of video results. The method can include capturing, by a camera of a user device, video data having a sequence of image frames. Additionally, the method can include capturing, by a microphone of the user device, audio data associated with the video data. Moreover, the method can include processing, using one or more machine-learned models stored on the user device, the audio data and the sequence of image frames to generate video embeddings, the video embeddings being derived by processing the video data concurrently with the audio data. Furthermore, the method can include transmitting, to a server, the video embeddings. In response to the transmission of the video embeddings and the audio data, the method can include receiving one or more video results from the server. Subsequently, presenting, on a display of the user device, the one or more video results.

Another example aspect of the present disclosure is directed at a computing system. The system can include one or more processors. Additionally, the system can include one or more non-transitory computer-readable media that collectively store instructions that, when executed by the one or more processors, cause the computing system to perform operations. The operations can include receiving, by a computing system comprising one or more processors, video data captured by a camera of a user device, the video data having a sequence of image frames. Moreover, the operations can include receiving audio data associated with the video data captured by the user device. Furthermore, the operations can include processing, using one or more machine-learned models, the sequence of image frames to generate video embeddings related to the sequence of the image frames, the video embeddings having a plurality of image embeddings associated with the sequence of image frames. The operations can include determining one or more video results based on the video embeddings and the audio data. Subsequently, the operations can include transmitting, to the user device, the one or more video results.

Another example aspect of the present disclosure is directed to one or more non-transitory computer-readable media that collectively store instructions that, when executed by one or more computing devices, cause the one or more computing devices to perform operations. The operations can include receiving, by a computing system comprising one or more processors, video data captured by a camera of a user device, the video data having a sequence of image frames. Additionally, the operations can include receiving audio data associated with the video data captured by the user device. Moreover, the operations can include processing, using one or more machine-learned models, the sequence of image frames to generate video embeddings related to the sequence of the image frames, the video embeddings having a plurality of image embeddings associated with the sequence of image frames. Furthermore, the operations can include determining one or more video results based on the video embeddings and the audio data. Subsequently, the operations can include transmitting, to the user device, the one or more video results.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 4A-4D depict illustrations of example use cases of using the multimodal search system according to example embodiments of the present disclosure.

FIG. 5 depicts a flow chart diagram of an example method to perform a multimodal search with a server having a machine-learned model according to example embodiments of the present disclosure.

FIG. 6 depicts a flow chart diagram of an example method to perform a multimodal search with a user device having a machine-learned model according to example embodiments of the present disclosure.

Figure 1:
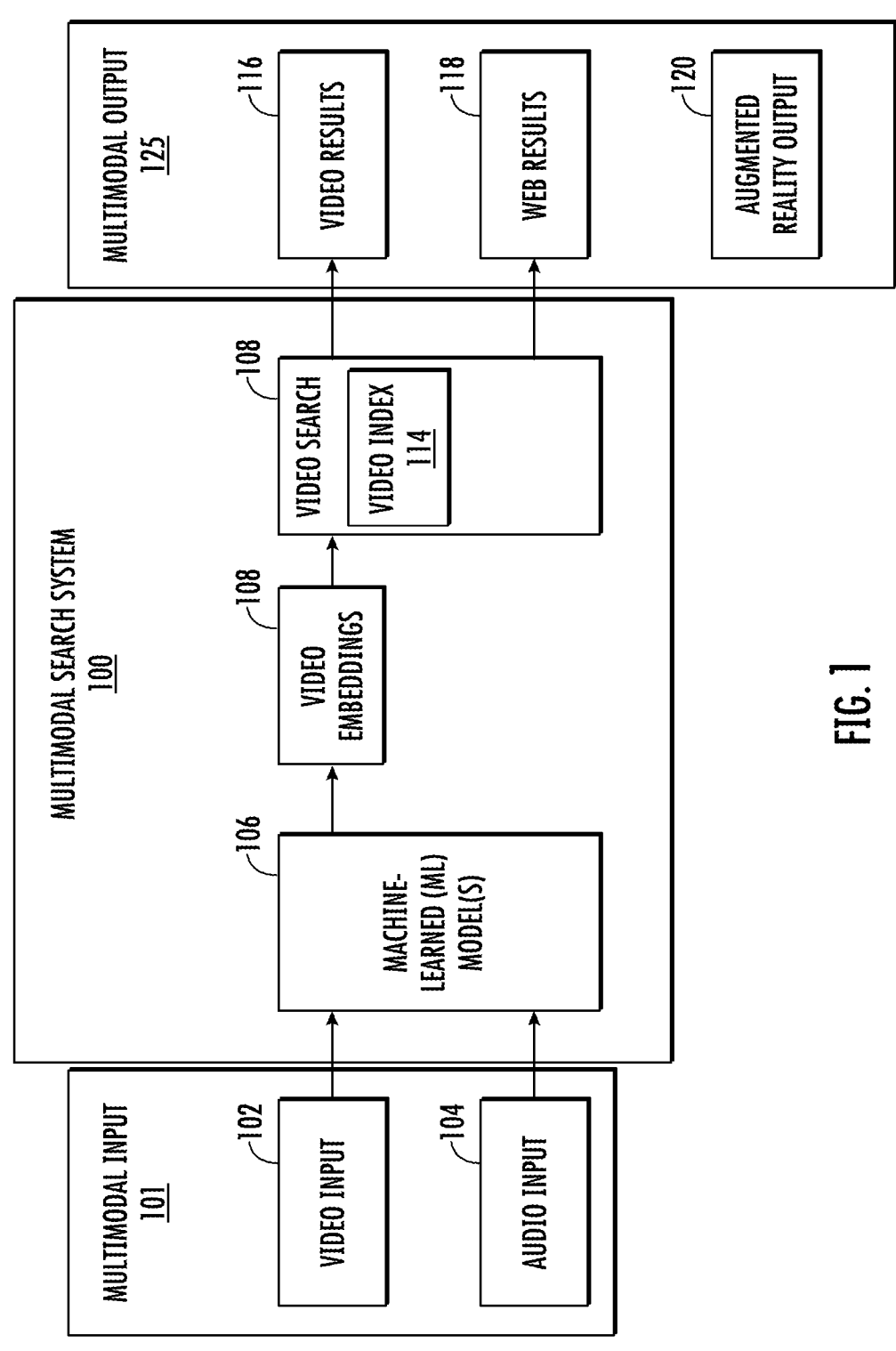
FIG. 1 depicts a block diagram of an example multimodal search system according to example embodiments of the present disclosure.

Reference numerals that are repeated across plural figures are intended to identify the same features in various implementations.

DETAILED DESCRIPTION

Overview

Today, users have many complex questions, such as how to fix an appliance making an unusual noise, requesting a tutorial video for learning certain dance moves in a video, or information about an object in a real-time video scene. These type questions can be difficult or impossible to query in a conventional search system using just text and audio data. However, many of these complex questions can be easily expressed by the user using video and audio data. By analyzing the visual and contextual aspects of video, the system can gain valuable insights into the intent and behavior of users in order to provide the correct answer.

Generally, the present disclosure is directed to systems and methods for improving search results by analyzing video data concurrently with audio data as part of the search query. In some instances, the system can process video data concurrently with audio data to understand complex needs, including nuances and context, to help users receive the correct answer. Alternatively, in some instances, the audio data is converted to text data, and then the video data is processed with text data to determine the search results. In particular, the systems and methods disclosed herein can leverage video data, audio data, and/or text data to provide a multimodal (e.g., search that combines audio and visual inputs) searching capabilities and a multimodal output.

According to some embodiments, by enabling users to perform a multimodal search (e.g., a video input and a voice command), the techniques described herein enable an increase of the number of information query to the search system. The system can, using machine-learned models, understand the content of videos, including the video context in sound in the video, user voice in the video, and frames of the video.

The system can enable a user to perform a multimodal search that feels as natural as asking an expert for assistance. Multimodal search refers to the process of retrieving information or conducting a search query using multiple modalities, such as video, speech, or other forms of data. The system can provide more comprehensive and intuitive search results by incorporating different types of media. Conventional search engines primarily rely on text-based queries and keyword matching to retrieve relevant information. However, in multimodal search, users can employ various modalities to express their queries, enabling a more natural and expressive interaction with search systems. For example, a multimodal search could involve submitting a voice command along with a video clip that is captured in real-time. The system can analyze the voice command and video clip to provide a response. By combining video and voice, the system enhances the search experience, improves result precision, and enables users to explore and discover information that was previously not possible.

For some complex questions, a user performing a multimodal query (e.g., video query) can be a natural way to express intent and ask a complex question. In some instances, video data can include visual actions and gestures data. The system can analyze the actions and gestures performed by an object in a video to infer intent. For example, intent can be inferred when a user is seen showing emotions based on hand gestures. Additionally, video data can include facial expressions and emotions data. For example, the facial expressions (e.g., frustration, confusion) exhibited by a user in a video can reveal their emotional state and provide information about their intent (e.g., seeking assistance or clarification). Moreover, video data can include eye tracking data. For example, the system can utilize eye tracking technology to determine where a user is looking within a video in order to determine a target object (e.g., object of interest). The system can analyze gaze patterns to gain insights into an area of interest to understand their intent and preferences. Furthermore, the video data can include contextual information. The system can analyze the video data to generate contextual information. For example, the system can analyze the surrounding context of the video to determine user intent. For example, the system can analyze the audio data of a video to identify keywords or phrases that indicate the user's topic of interest or their specific query. The system can determine user intent from the video data by processing the video data with the voice command using machine-learned models. Additionally, using the techniques described herein, the machine-learned models can be trained to analyze the visual and contextual aspects of video data to better understand the content of the video data.

According to some embodiments, the system described herein improves the multimodal experience by providing a novel way for a user to formulate questions with multiple modalities (e.g., video and voice) at the same time. The system can enable the growth of info seeking query streams and introduce new types of queries. Moreover, the system can utilize large language models (LLMs) to improve search results associated with opinion and action seeking queries. The system can utilize machine-learned models to present artificial intelligence (AI) generated answers and outputs. The techniques described herein significantly reduce friction in formulating multimodal queries, which results in improved user experience.

Additionally, by enabling new ways to input data for a search request, the system increases the search space for potential search results. By incorporating video data in combination with audio data, the system is able to increase the search space for potential search results, which in turn improves the user's experience. In some embodiments, the system solves use cases that require the system to truly understand audio along with the video. For example, when a user's vehicle is making a specific sound, describing that sound or issue in words can be difficult if not impossible. The system described herein can receive the audio data associated with the sound along with the video of the vehicle running and return a search result for fixing the vehicle. The system can determine the make and model of the vehicle from the video embeddings extracted from the video data. Additionally, the system can determine that the audio data is associated with a problem associated with the specific make and model. Continuing with this example, the search results can include a video tutorial of how to fix this problem. In some implementations, the search results can include augmented reality instructions to fix the problem with the vehicle.

The multimodal models can receive a video as the query to look up a result from a video index. The system can include a video retrieval benchmark. The video retrieval benchmark can be a standardized evaluation framework or dataset used to assess the performance of retrieval models or algorithms. The video retrieval benchmarks can be specific to various information retrieval tasks, such as video retrieval, question answering, recommendation systems. The video retrieval benchmark can include a collection of queries or inputs, a set of answers, and performance metrics to measure the quality of retrieved results. The video retrieval benchmarks can offer benchmark datasets and metrics for video retrieval tasks, such as content-based video search and video summarization in order to train the multimodal models. Evaluation metrics used in the video retrieval benchmarks can include precision, recall, mean average precision, and normalized discounted cumulative gain. These metrics quantify the relevance, ranking, and overall effectiveness of retrieved results.

The systems and methods of the present disclosure provide a number of technical effects and benefits. As one example, the system and methods can improve search results by enabling multimodal searching capabilities. Additionally, by concurrently using video data and audio data to determine video embeddings, and then mapping the video embeddings, the system can provide more accurate search results by enhancing the query with additional signals that provide helpful context for the search. For example, the video embeddings can be real-valued vectors that encode the meaning of the video and can be searched concurrently in a multi-dimensional vector space to provide more accurate search results. Furthermore, by enabling multimodal searching capabilities, the system increases the search space for potential search results by now being able to perform searches that may have been impossible to perform before. As the vehicle example above highlights, a user is able to perform a search that may have been previously impossible, and the system is now able to provide tutorials on how to fix the problem with the vehicle by analyzing the audio and video data concurrently. In some instances, the search results are provided faster to the user by reducing the number of interactions with the user. In particular, the systems and methods disclosed herein can leverage an interactive user interface that enables a user to use video data to provide better, faster, and more accurate search results. Furthermore, by concurrently analyzing the video data with the audio data to generate the video embeddings, the search query can be performed faster than conventional systems, which typically convert the audio data to text and then input the text to the machine-learned model.

Another technical effect and benefit relate to improved computational efficiency and improvements in the functioning of a computing system. For example, the systems and methods disclosed herein can leverage the multimodal search system to provide a more comprehensive multimodal search query that can mitigate the use of additional searches and additional search result page browsing, which can save time, processing resources, energy, and computational power.

FIG. 1 depicts a block diagram of an example multimodal search system 100 according to example embodiments of the present disclosure. The multimodal search system 100 can receive a multimodal input 101 to generate a multimodal output 125. For example, the multimodal search system 100 can be a video-and-audio search system that processes video data 102 and audio data 104 to generate video results 116, web results 118, and/or augmented reality output 120. The video data 102 can be captured by a camera of a user device. The audio data 104 can be captured by a microphone of the user device. Additionally, the audio data 104 can be associated with the video data 102. For example, a user can take a video of a scene and provide a voice command associated with the scene of the video.

In some instances, the multimodal search system 100 can receive the multimodal input 101 (e.g., video data 102 and audio data 104) and process the data to generate a multimodal output 125. For example, the video data 102 can include a video of a person dancing, and the audio data can be a voice command stating, "how can I learn these dance moves?" The multimodal search system 100 can input the video data 102 and the audio data 104 into the machine-learned models 106 to generate video embeddings 108 and temporal information 112. Subsequently, the multimodal search system 100, using the video search module 110 having a video index 114, can search for a tutorial video of learning how to dance in a similar manner as the person dancing in the video data 102. The multimodal search system 100 can then present the tutorial video as part of the video results 116.

According to some embodiments, a user can take a video to perform a query (e.g., how-to do something query). In some instances, the visual information as well as spoken language are inputted into the multimodal search system 100. The multimodal search system 100 can have one or more machine-learned models 106 that can process and understand both textual and visual information simultaneously. The one or more machine-learned models 106 (e.g., multimodal models) enable the integration of language and video data, allowing for tasks such as video captioning, visual question answering, and cross-modal retrieval.

According to some embodiments, the audio data 104 can be a voice input from the user, such as a search query, a question, an inquiry, a command, an action to be performed, a scene exploration, and/or a response to a prompt. The system 100 can determine the multimodal output 125 based on the category of the audio data. For example, if the audio data 104 is a question (e.g., "find me a tutorial video for this dance move"), then the multimodal output 125 can be a video result 116 of tutorial videos. Alternatively, if the specific category is a scene exploration (e.g., "where in the vehicle do I put the coolant"), then the multimodal output 125 can be an augmented reality output 120. In yet another alternative output, if the specific category is an image search query (e.g., find similar dresses like this the dress in this video), then the multimodal output 125 can be web results 118.

According to some embodiments, the multimodal search system can include one or more machine-learned models 106 that can process the video data 102 and the audio data 104 concurrently to generate video embeddings 108. Alternatively, in another embodiment, the one or more machine-learned models 106 that can process the video data 102 and text data that is derived from the audio data 104 to generate video embeddings 108.

In some instances, the one or more machine-learned models 106 can be trained using encoder-decoder tasks. The one or more machine-learned models 106 can be a multimodal model that can process both video and audio data concurrently. Given that encoder-decoder tasks are used during training, the multimodal search system 100 can obtain video embeddings 108 by using an average pooling of encoder output. Additionally, to improve embedding quality, the one or more machine-learned models 106 can be fine-tuned using adapters. Adapters can be used to fine-tune the one or more machine-learned models 106 by enabling efficient and targeted modifications to specific parts of the model architecture. The system can define an adapter architecture, which can be a lightweight module that can be added to the one or more machine-learned models 106. The system can initialize the parameters of the adapters randomly or by using transfer learning techniques. The system can freeze the parameters of the one or more machine-learned models 106 and only train the adapters. This focused training helps the adapters specialize for the target task while preserving the knowledge captured in the one or more machine-learned models 106. The system can prepare a task-specific dataset that contains multimodal examples relevant to the fine-tuning objective. The system can feed the multimodal data (e.g., video and audio data) through the one or more machine-learned models 106 with the adapters added. Subsequently, the system can compute the loss between the predicted outputs and the ground truth labels, and back-propagate the gradients to update the adapter parameters. The system can adjust hyperparameters, such as learning rate, batch size, or regularization techniques, to optimize the performance of the one or more machine-learned models 106. By using adapters in the fine-tuning process, the one or more machine-learned models 106 can be efficiently adapted to new multimodal tasks or domains without extensive retraining from scratch. Adapters allow for more focused updates, reducing the risk of catastrophic forgetting and accelerating the fine-tuning process.

In some instances, the one or more machine-learned models 106 can be trained using pre-training data and introduce a mixture of pre-training tasks to prepare the model for a variety of downstream applications. For example, the system can enable knowledge-sharing between video and language tasks by casting all tasks into a single generalized Application Programming Interface (API) having video and audio data that has the input to solve a wide variety of tasks associated with the different use cases. The objectives used for pre-training can be inputted into the API as a weighted mixture aimed at training the one or more machine-learned models 106 to perform new tasks (e.g., split-captioning for video description, Optical Character Recognition (OCR) prediction for scene-text comprehension, visual question answering (VQA) prediction). For example, the one or more machine-learned models 106 can be trained using an open-source framework for both the video data 102 and the audio data 104. For the audio data 104, the system can concatenate the dense token embeddings with the patch embeddings produced by the video data 102, together as the input to the multimodal encoder-decoder. During the training of the one or more machine-learned models 106, the weights of the multimodal encoder-decoder are updated.

According to some embodiments, the multimodal search system 100 can input the video embeddings 108 generated by the one or more machine-learned models 106 into a video search module 110. The video search module 110 can determine multimodal output 125 based on mapping of the video embeddings 108 with a video index 114. For example, the video search module 110 can be a web-based tool and/or a mobile-app based tool that allows users to search for, find, and access videos across the internet. The video search module 110 specifically indexes and retrieves video data. The video search module 110 can crawl and scan the internet to find video data. The video search module 110 can index the video content in a video index 114. Additionally, the video search module 110 can use algorithms (e.g., machined-learned algorithms) to determine the most relevant videos for a query. The algorithms take into account various factors like the video's metadata, popularity, and how closely it matches with the video embeddings 108.

In some instances, the multimodal search system 100 can build a video index 114 having video embeddings. The video index 114 can include a structured representation of the content and metadata within a collection of videos, enabling efficient search, retrieval, and analysis. First, the multimodal search system 100 can gather video data (e.g., video) to index. For example, the video data can be a large-scale dataset of millions of narrated videos with an emphasis on instructional videos (e.g., HowTo100M dataset). Each video in the video index 114 database can be processed using the machine-learned models 106 to generate video embeddings for each video. The video embeddings stored in the video index 114 can be a resulting vector of the video that can be compared with the video embeddings 108 generated based on the multimodal input 101. The multimodal search system 100 can extract embeddings (e.g., features, video features, video embeddings) from the videos that can be used for indexing and searching. The video embeddings can capture different modalities of the video data. The multimodal search system 100 can annotate each video with metadata, such as title, description, tags, timestamps, and any other relevant information. The metadata can provide additional context and aids in efficient retrieval and filtering. The multimodal search system 100 can utilize an indexing structure based on specific requirements of the machine-learned models 106 and/or video embeddings 108. Indexing structures for video can include inverted indexes, hash-based methods, or content-based retrieval methods like video fingerprints. These structures allow for efficient storage and retrieval of video data. The multimodal search system 100 can index the preprocessed videos by storing the extracted video embeddings, features, metadata, and any necessary indexing structures in a structured manner by mapping the video features and metadata to their corresponding identifiers or keys. The multimodal search system 100 can implement machine-learned search algorithms to enable efficient search and retrieval of videos based on video embeddings 108, keywords, similarity, time range, or other relevant parameters. The multimodal search system 100 can build the video index 110 using a combination of domain-specific knowledge, data preprocessing techniques, feature extraction methods, and indexing algorithms.

Additionally, the machine-learned models 106 can generate (e.g., determine) temporal information 112 based on the input video data 102 and audio data 104. The machine-learned models 106 can generate temporal information 112 using Recurrent Neural Networks (RNNs), Long Short-Term Memory (LSTM) networks, and 3D Convolutional Neural Networks (3D-CNNs) techniques. Temporal information 112 can include the change and progression of content (e.g., video data 102 and audio data 104) over time. Unlike static images, video data 102 is dynamic, which allows the machine-learned models 106 to capture movement and transitions that unfold as time progresses. Temporal information 112 can include motion data, continuity data, changes in scene data, changes in audio data, and other changes of content over time data. Motion data can represent the movement of objects or the camera itself within the video frames. Continuity data can include understanding a sequence of events or actions in the video to determine the storyline or the action flow in the video. Change in scene data can include changes in the scene, lighting, or object properties over time. For instance, a day-to-night transition, an object changing color, or a facial expression changing from happy to sad. Changes in audio data include sounds that provide temporal information, such as the progression of speech, changes in music, or environmental sounds that occur at certain moments in the video. Temporal information 112 can be utilized by the video search module 110 in tasks such as action recognition, event detection, video summarization, and anomaly detection. The machine-learned models 106 can determine temporal information 112 using Recurrent Neural Networks (RNNs), Long Short-Term Memory (LSTM) networks, and 3D Convolutional Neural Networks (3D-CNNs) techniques.

The video search module 110 can perform a query refinement based on the temporal information 1112. Query refinement can include a process of reformulating a given query to improve retrieval performance in information retrieval operations, particularly in the context of query understanding based on the temporal information. Query refinement can involve determining a user's intent by evaluating temporal information 112 and refining the search query based on the temporal information 112.

Figure 2:
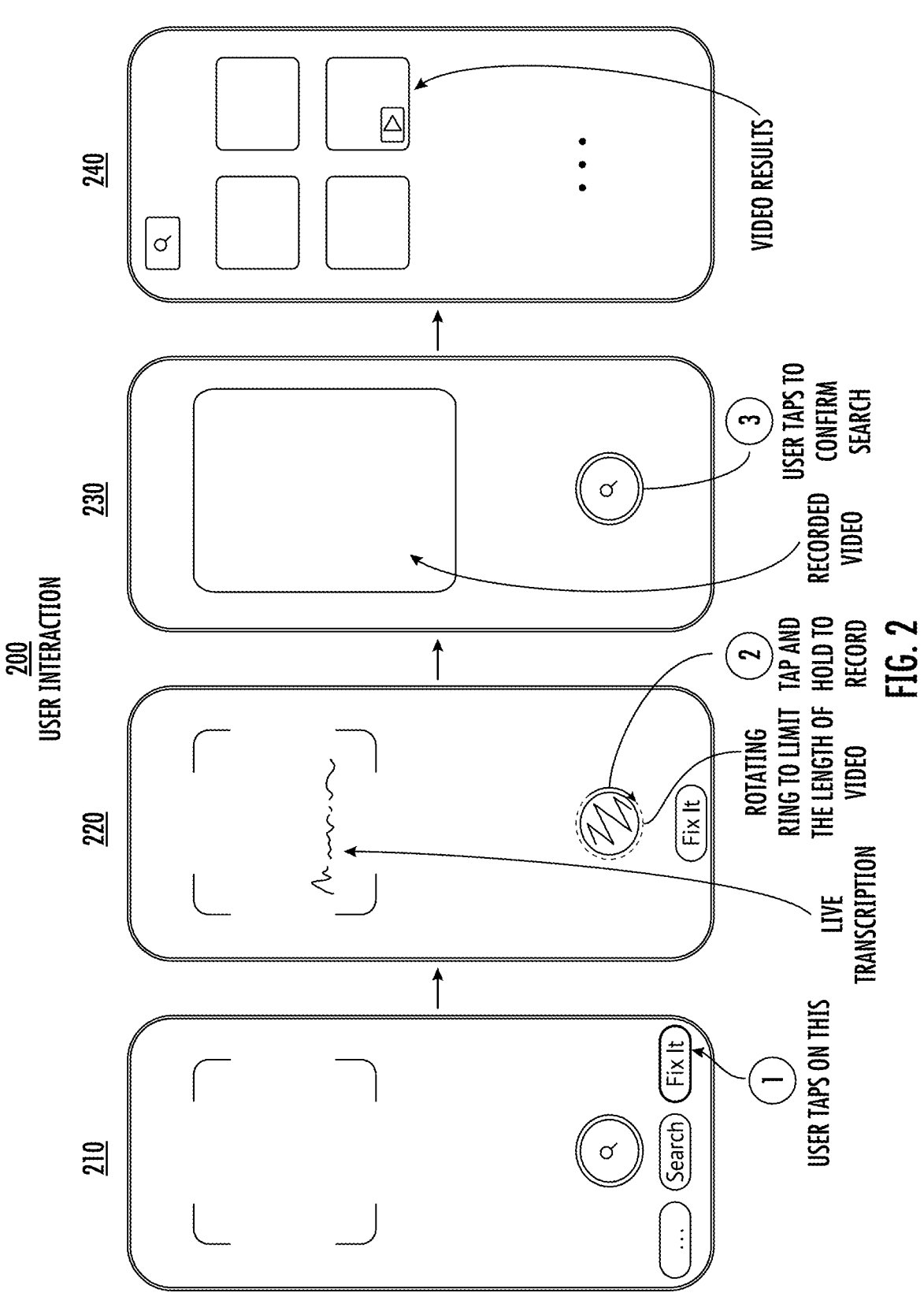
FIG. 2 depicts a block diagram of an example user interface of a multimodal search system according to example embodiments of the present disclosure.

FIG. 2 depicts a block diagram of an example user interfaces 200 of the multimodal search system according to example embodiments of the present disclosure. The user interfaces 200 can include a first user interface 210 that enables a user to select a category button to obtain video results 116, web results 118, or an augmented reality output 120. For example, the category button can be a 'fix it' button 212, a 'search' button 214, or a 'augmented reality' button. Once the button is selected, the second user interface 220 allows the user to record a video using the record button 222. The record button can include a rotating ring that limits the length of the video recording. In some instances, the video recording can be limited to 30 seconds or less. After the video recording is completed, the third user interface 230 can display a recording of the video 232 and also provide a confirm button 234 to perform the search. Subsequently, the fourth user interface 240 can present the video results 242, 244, 246, 248 to the user.

Figure 3A:
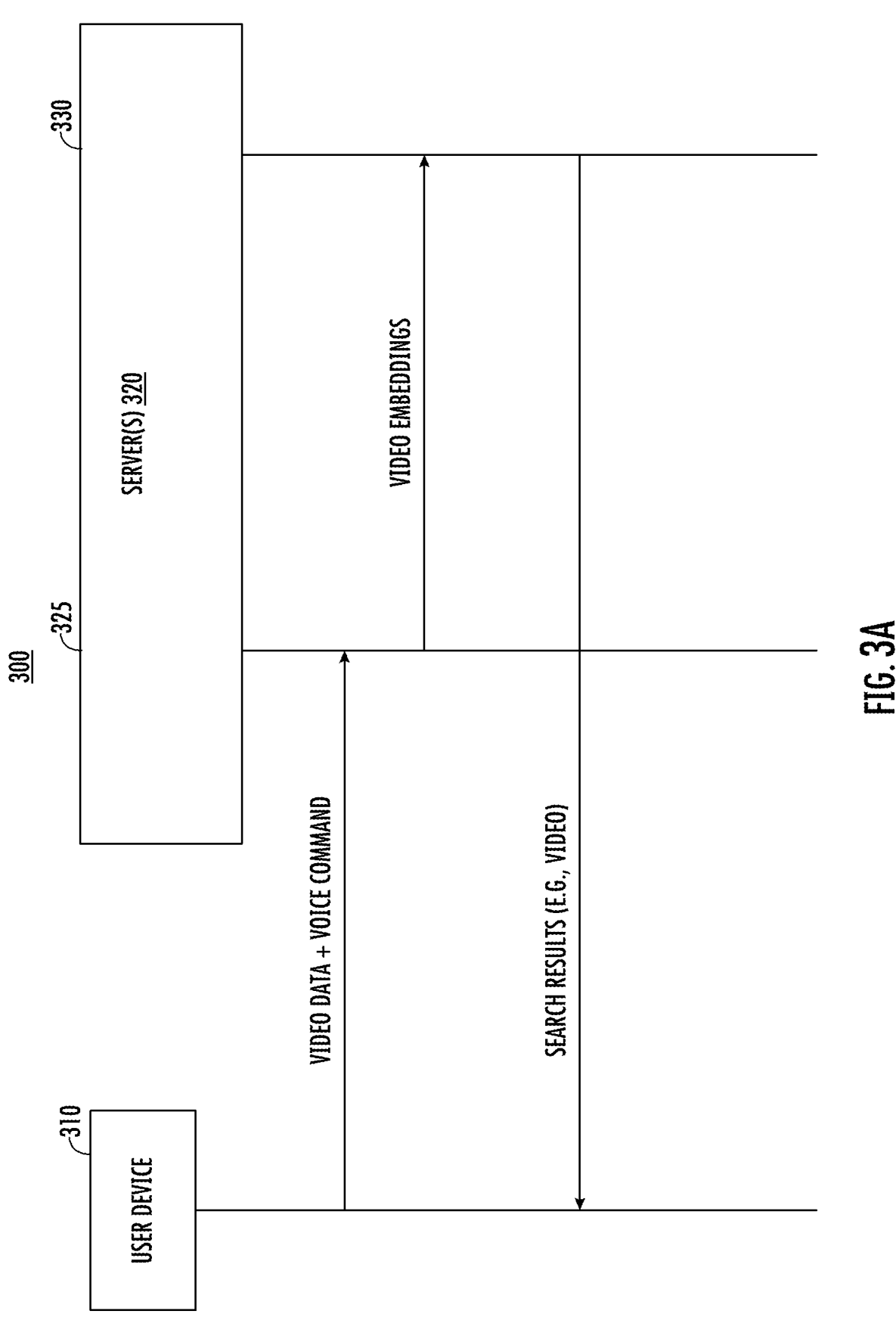
FIG. 3A depicts a block diagram of an example multimodal search system with the machine-learned model being stored in a server according to example embodiments of the present disclosure.

FIG. 3A depicts a block diagram of an example multimodal search system 300 with the machine-learned model being stored in a server according to example embodiments of the present disclosure. In this system 300, the machine-learned model(s) 325 (e.g., machine-learned model(s) 106) is part of the server(s) 320. In this embodiment, at 302, the user device 310 can capture and transmit both the voice data and audio data to the server(s) 320. The server(s) 320 can include the machine-learned model 325 and the search server (e.g., video search module 110). At 304, the machine-learned model(s) 325, which is stored in the server(s) 320 can generate video embeddings using the video data and voice command received from the user device 310. Additionally, at 304, the machine-learned model(s) 325 can transmit the video embeddings to the search server 330. At 306, the search server 330 can return the search results to the user device 310.

Figure 3B:
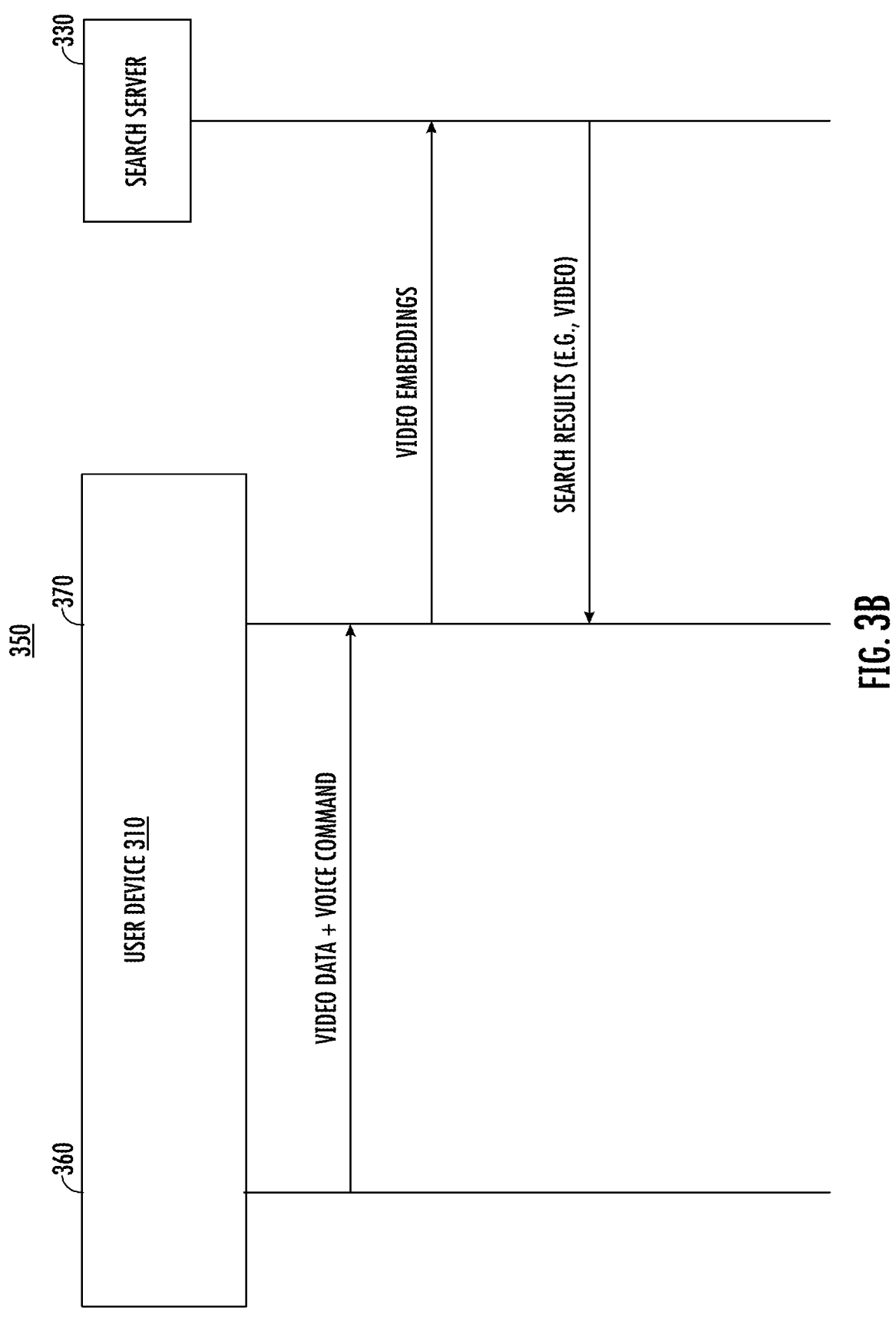
FIG. 3B depicts a block diagram of an example multimodal search system with the machine-learned model being stored in a user device according to example embodiments of the present disclosure.

FIG. 3B depicts a block diagram of another example multimodal search system 350 with the machine-learned model being stored in a user device according to example embodiments of the present disclosure. In this system 350, the machine-learned model(s) 370 (e.g., machine-learned model(s) 106) is part of the user device 355. In this embodiment, at 352, input devices 360 of the user device 355 can capture and transmit the voice data and audio data to the machine-learned model(s) 370. At 354, the machine-learned model(s) 370, which is stored in the user device 355, can generate video embeddings using the video data and voice command received from the input devices 360. Additionally, at 304, the machine-learned model(s) 325 can transmit the video embeddings to the search server 330. At 306, the search server 330 can return the search results to the user device 355.

Example Use Cases

Figure 4A:
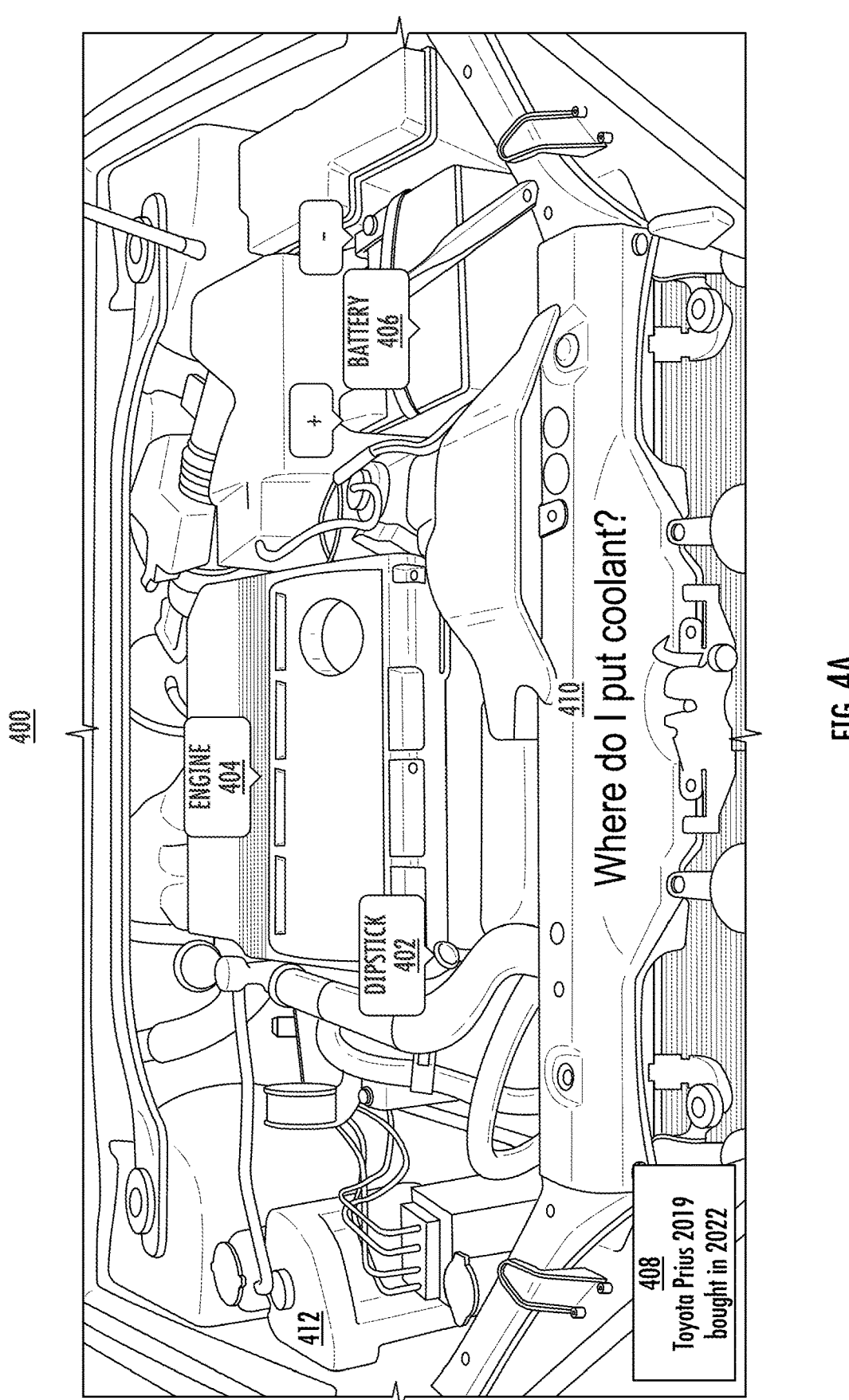
Figure 4B:
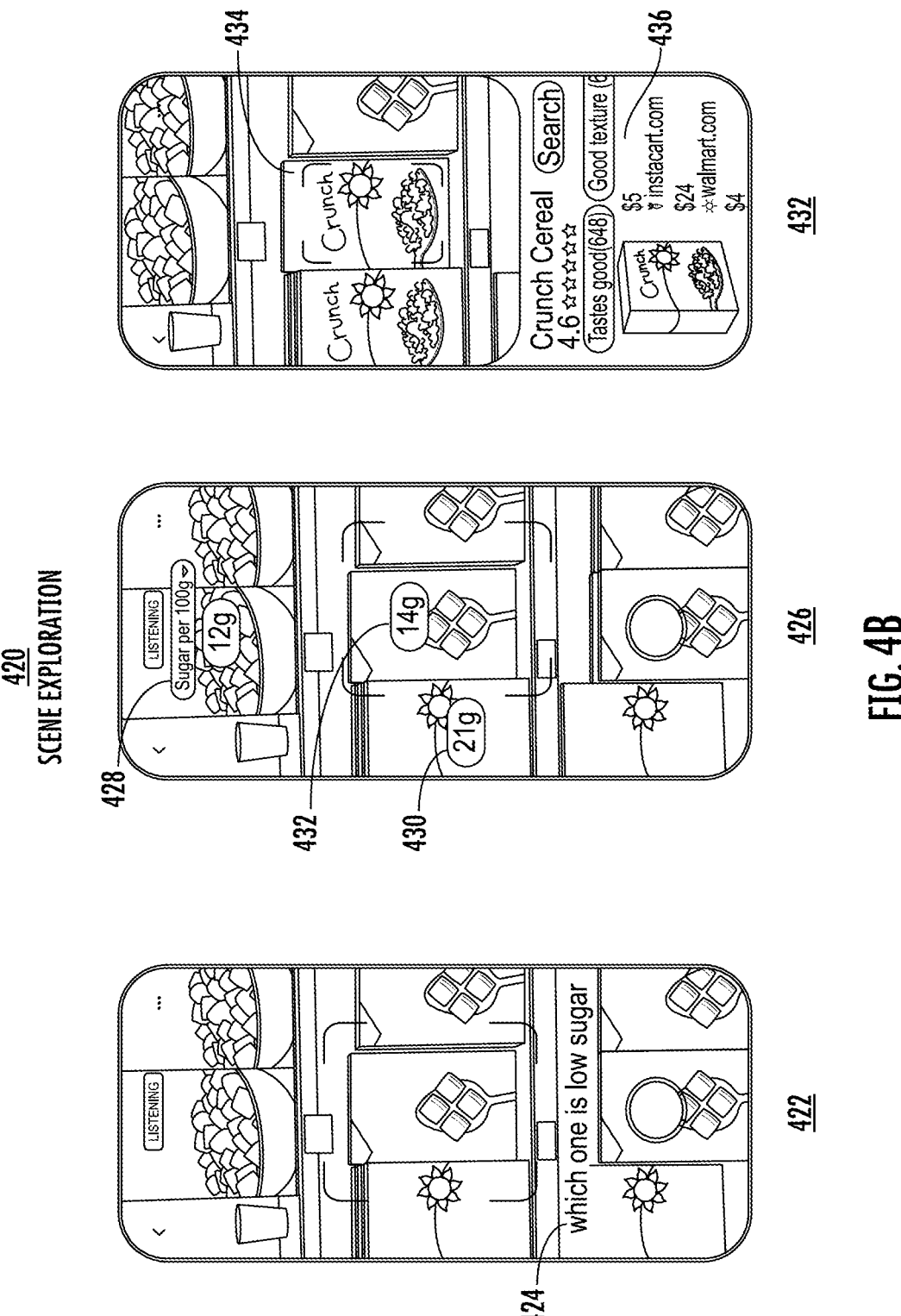
Figure 4D:
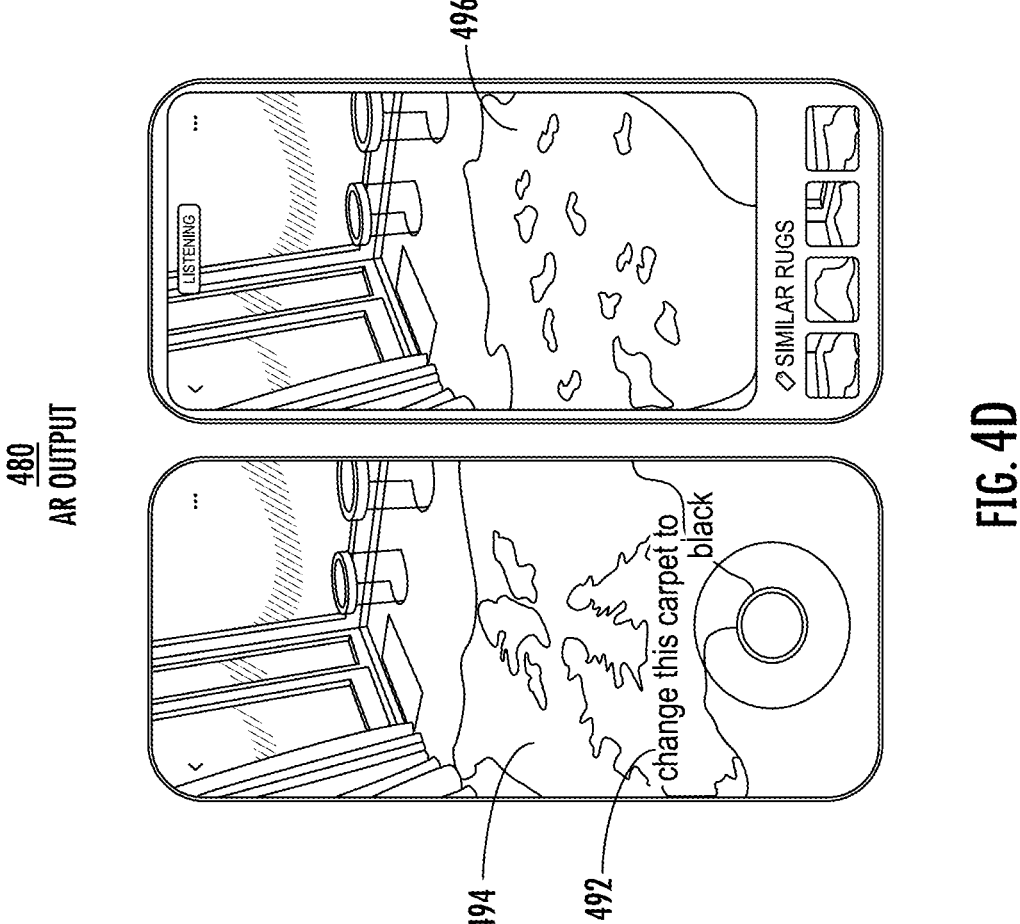

According to some implementations, the multimodal search system 100 can be utilized in a plurality of use cases. The type of use cases can include, but are not limited to, an information query as illustrated in FIG. 4A, a scene exploration as illustrated in FIG. 4B, a motion tutorial query as illustrated in FIG. 4C, and an augmented reality experience as illustrated in FIG. 4D. The multimodal output 125 described in FIG. 1 can be dependent on the type of use case and/or category button. Additionally, as described in the first user interface 210 in FIG. 2, in some embodiments, a user can select a category button 212, 214 associated with a use case.

FIG. 4A depicts an information query use case 400, according to example embodiments of the present disclosure. In the information query use case 400, the system can assist a user obtain information. For example, a user can take a video clip of a vehicle with the hood open and provide a voice command stating, "where do I put the coolant?" In this use case, the system can present information about the scene, such as the location of the oil dipstick 402, the engine 404, the battery 406, contextual information 408, and highlight the answer, which is the location of the radiator reservoir 412 for putting the coolant into.

In another information query use case (not pictured), the user can take a video of an electric fan making an unusual noise and also record a voice command such as "help me fix it, there is a clicking noise." The videoclip can be of the electric fan while turned on having an video clip of the issue (e.g., clicking noise). This type of information query may be very hard, if not impossible, for a user to express this intent with a single modality and get an answer. The context from audio, the visuals, and what the user is trying can be inputted into the system to generate an answer.

FIG. 4B depicts a scene exploration use case 420, according to example embodiments of the present disclosure. In the scene exploration use case 420, in the first user interface 422, a user may provide a voice command 424 stating "show me the sugar content of each item," while recording a video clip of an aisle in a grocery store. In the second user interface 426, the system can determine a plurality of target objects 428, 430, 432 in the video clip and determine the nutritional value of each target object. In the third user interface 434, the system can either present the nutritional value of each target object directly on the mobile device or select a target object 436 based on an analysis of the nutritional value 438 of each target object.

FIG. 4C depicts a motion tutorial use case 460, according to example embodiments of the present disclosure. The user may request the system to learn the dance moves of a dance video clip having a sequence of image frames. The sequence of image frames can include a first image frame 462, a second image frame 464, and a third image frame 466. The machine-learned models can determine the video embeddings and temporal information by analyzing the sequence of image frames. In this use case 460, the system can determine the different motions by analyzing the video and provide the user a tutorial video to perform the dance moves.

FIG. 4D depicts an augmented reality experience use case 480, according to example embodiments of the present disclosure. The user may request the system change the color 492 of an object 494 in the video or add an object to the video. In this example, an attribute (e.g., color) of a target object (e.g., rug) is changed to a different attribute 496.

With reference now to the Figures, example embodiments of the present disclosure will be discussed in further detail.

Example Methods

FIG. 5 depicts a flow chart diagram of an example method to perform a multimodal search using a server having a machine-learned model, according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

The method 500 can be performed by a computing system such as the multimodal search system 100 in FIG. 1, the user device 310, the server(s) 320, server computing system 730, sensor processing system 60, or output determination system 80.

At 502, a computing system (e.g., multimodal search system 100, server(s) 320, server computing system 730) can receive video data captured by a camera of a user device. The video data can have a sequence of image frames. In some instances, the user device at 502 can be the user device 310 in FIG. 3A, user computing system 702 in FIG. 7A or the user computing system 52 in FIG. 7B.

At 504, the computing system can receive audio data associated with the video data captured by the user device.

In some instances, the method can further include processing, using an automatic speech recognition technique, the audio data to generate a text query. The determination of the one or more video results can be further based on the text query. In some instances, the method can further include processing, using the one or more machine-learned models, the text query and video embeddings concurrently to determine the one or more video results.

In some instances, the method can include processing the audio data to generate an input audio signature. The determination of the one or more video results can be further based on the input audio signature. Additionally, the determination of the one or more search results can include detecting a target object in the video data. Moreover, the method can include accessing from an audio signature database a plurality of known audio signatures that are associated with the target object. Furthermore the method can include selecting a matching audio signature from the known audio signatures, wherein a comparison score of the matching audio signature exceeds a threshold value. The matching score of the matching audio signature can be calculated by comparing the input audio signature with the matching audio signature. The one or more video results can be further determined based on the matching audio signature.

At 506, the computing system can process, using one or more machine-learned models, the sequence of image frames to generate video embeddings related to the sequence of the image frames. The video embeddings can have a plurality of image embeddings associated with the sequence of image frames.

In some instances, the processing of the sequence of image frames to generate the video embeddings can include selecting, using a frame selection algorithm, a subset of image frames from the sequence of image frames. Additionally, the method can include processing each image frame in the subset of image frames to generate a plurality of image embeddings. The plurality of image embeddings can have an image embedding for each image frame in the subset of image frames. Moreover, the method can include determining the video embeddings based on the plurality of image embeddings. The video embeddings can be determined by averaging each image embedding in the plurality of image embeddings. The frame selection algorithm can be a uniform random sampling of frames, where the subset of image frames is selected at a regular interval, such as every nth frame. Additionally, or alternatively, the frame selection algorithm can be based on the position of the camera and an orientation of the camera.

In some instances, the processing of the sequence of image frames to generate the video embeddings can include detecting a target object in the video data. Additionally, the frame selection algorithm is based on a spatial relationship between the camera and the target object. Moreover, the spatial relationship can include a translation vector that represents a position of the camera in a three-dimensional space relative to the target object. The translation vector can specify the distance that the camera is displaced with respect to the target object. Moreover, the spatial relationship can include a rotation matrix that represents an orientation of the camera in a three-dimensional space relative to the target object. The orientation matrix can specify the degree of rotation of the camera with respect to the target object.

In some instances, the frame selection algorithm can be running on the user device and the video data received is a subset of images from the sequence of image frames. The video embeddings can be generated by processing the subset of image frames. Additionally, the video embeddings can have temporal information associated with the subset of image frames.

In some instances, the method can further include processing, using the one or more machine-learned models, the sequence of image frames to generate temporal information related to the sequence of the image frames. The determination of the one or more video results can be further based on the temporal information related to the sequence of the image frames.

In some instances, the processing of the sequence of image frames to generate the video embeddings can include processing, using the one or more machine-learned model, each image frame in the sequence of image frames to generate the video embeddings. Additionally, the method can include mapping the generated video embeddings to an index of video embeddings. The one or more video results can be determined based on the mapping of the generated video embeddings to the index of video embeddings. Moreover, the mapping of the generated video embeddings to the index of video embeddings can include ranking each video embedding in the index of video embeddings based on a comparison with the generated video embeddings. Each video embedding can be associated with a video result. The one or more video results can be determined based on the ranking of each video embedding in the index of video embeddings.

In some instances, the one or more machine-learned model can include a polymath model. A polymath model refers to a machine learning model that is designed to exhibit a wide range of knowledge and skills across multiple domains. A polymath model can leverage LLMs to understand and generate content across different domains. A polymath model can be used for various tasks, such as natural language understanding, question answering, language translation, text summarization, and creative writing. The one or more machined-learned models can be trained on vast amounts of data from diverse sources, allowing the models to acquire knowledge from a wide range of domains. For example, the one or more machine-learned models can be trained using tutorial videos publicly available on an online video sharing platform.

In some instances, the one or more machine-learned model can include a multimodal multitask unified model that is trained to understand information from a plurality of formats, the plurality of formats including video and text.

At 508, the computing system can determine one or more video results based on the video embeddings and the audio data.

At 510, the computing system can transmit, to the user device, the one or more video results.

In some instances, the method can further include determining one or more web results based on the video embeddings. Additionally, the method can include transmitting, to the user device, the one or more web results.

In some instances, the method can further include processing, using the one or more machine-learned models, the audio data with the sequence of image frames to generate video embeddings.

FIG. 6 depicts a flow chart diagram of an example method to perform a multimodal search using a user device having a machine-learned model, according to example embodiments. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

The method 600 can be performed by a computing system such as the multimodal search system 100 in FIG. 1, the user device 355 in FIG. 3B, user computing system 702, sensor processing system 60, or output determination system 80.

At 602, a computing system can capture, using a camera, video data having a sequence of image frames.

At 604, the computing system can capture, using a microphone, audio data associated with the video data. In some instances, the method can further include processing, using an automatic speech recognition technique, the audio data to generate a text query. The determination of the one or more video results can be further based on the text query. In some instances, the method can further include processing, using the one or more machine-learned models, the text query and video embeddings concurrently to determine the one or more video results.

In some instances, the method can include processing the audio data to generate an input audio signature. The determination of the one or more video results can be further based on the input audio signature. Additionally, the determination of the one or more search results can include detecting a target object in the video data. Moreover, the method can include accessing from an audio signature database a plurality of known audio signatures that are associated with the target object. Furthermore the method can include selecting a matching audio signature from the known audio signatures, wherein a comparison score of the matching audio signature exceeds a threshold value. The matching score of the matching audio signature can be calculated by comparing the input audio signature with the matching audio signature. The one or more video results can be further determined based on the matching audio signature.

At 606, the computing system can process, using one or more machine-learned models stored on the user device, the audio data, and the sequence of image frames to generate video embeddings. The video embeddings can be derived by processing the video data concurrently with the audio data. In some instances, the method can further include processing, using the one or more machine-learned models, the audio data with the sequence of image frames to generate video embeddings.

In some instances, the processing of the sequence of image frames to generate the video embeddings can include selecting, using a frame selection algorithm, a subset of image frames from the sequence of image frames. Additionally, the method can include processing each image frame in the subset of image frames to generate a plurality of image embeddings. The plurality of image embeddings can have an image embedding for each image frame in the subset of image frames. Moreover, the method can include determining the video embeddings based on the plurality of image embeddings. The video embeddings can be determined by averaging each image embedding in the plurality of image embeddings. The frame selection algorithm can be a uniform random sampling of frames, where the subset of image frames is selected at a regular interval, such as every nth frame. Additionally, or alternatively, the frame selection algorithm can be based on the position of the camera and an orientation of the camera.

In some instances, the processing of the sequence of image frames to generate the video embeddings can include detecting a target object in the video data. Additionally, the frame selection algorithm is based on a spatial relationship between the camera and the target object. Moreover, the spatial relationship can include a translation vector that represents a position of the camera in a three-dimensional space relative to the target object. The translation vector can specify the distance that the camera is displaced with respect to the target object. Moreover, the spatial relationship can include a rotation matrix that represents an orientation of the camera in a three-dimensional space relative to the target object. The orientation matrix can specify the degree of rotation of the camera with respect to the target object.

In some instances, the frame selection algorithm can be running on the user device and the video data received is a subset of images from the sequence of image frames. The video embeddings can be generated by processing the subset of image frames. Additionally, the video embeddings can have temporal information associated with the subset of image frames.

In some instances, the method can further include processing, using the one or more machine-learned models, the sequence of image frames to generate temporal information related to the sequence of the image frames. The determination of the one or more video results can be further based on the temporal information related to the sequence of the image frames.

In some instances, the processing of the sequence of image frames to generate the video embeddings can include processing, using the one or more machine-learned model, each image frame in the sequence of image frames to generate the video embeddings. Additionally, the method can include mapping the generated video embeddings to an index of video embeddings. The one or more video results can be determined based on the mapping of the generated video embeddings to the index of video embeddings. Moreover, the mapping of the generated video embeddings to the index of video embeddings can include ranking each video embedding in the index of video embeddings based on a comparison with the generated video embeddings. Each video embedding can be associated with a video result. The one or more video results can be determined based on the ranking of each video embedding in the index of video embeddings.

In some instances, the one or more machine-learned model can include a polymath model. Additionally, the one or more machine-learned models can be trained using tutorial videos publicly available on an online video sharing platform.

In some instances, the one or more machine-learned model can include a multimodal multitask unified model that is trained to understand information from a plurality of formats, the plurality of formats including video and text.

At 608, the computing system can transmit, to a server, the video embeddings.

At 610, in response to the transmission of the video embeddings and the audio data, the computing system can receive one or more video results from the server.

At 612, the computing system can present, on a display of the user device, the one or more video results. In some instances, the method can further include receiving one or more web results based on the video embeddings. Additionally, the method can include transmitting, to the user device, the one or more web results.

Figure 7A:
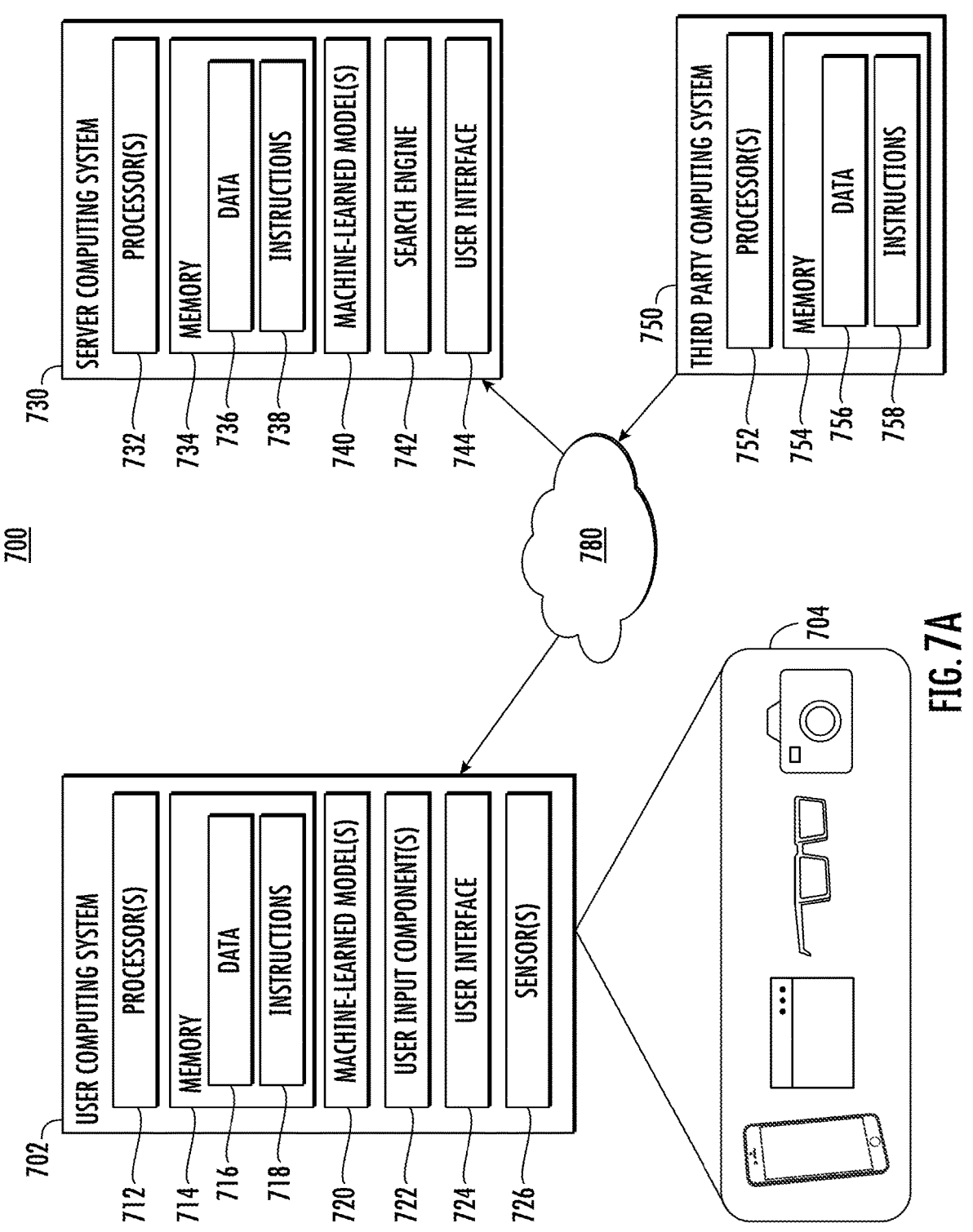
FIG. 7A depicts a block diagram of an example computing system that performs a multimodal search according to example embodiments of the present disclosure.

FIG. 7A depicts a block diagram of an example computing system 100 that performs a multimodal search according to example embodiments of the present disclosure. The system 700 includes a user computing system 702, a server computing system 730, and/or a third computing system 750 that are communicatively coupled over a network 780.

The user computing system 702 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 702 includes one or more processors 712 and a memory 714. The one or more processors 712 can be any suitable processing device (e.g., a processor core, a microprocessor, an ASIC, a FPGA, a controller, a microcontroller, etc.) and can be one processor or a plurality of processors that are operatively connected. The memory 714 can include one or more non-transitory computer-readable storage mediums, such as RAM, ROM, EEPROM, EPROM, flash memory devices, magnetic disks, etc., and combinations thereof. The memory 714 can store data 716 and instructions 718 which are executed by the processor 712 to cause the user computing system 702 to perform operations.

In some implementations, the user computing system 702 can store or include one or more machine-learned models 720. For example, the machine-learned models 720 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. The machine-learned models 720 can be an example of the query refinement 108 in FIG. 1, the query refinement 210 in FIG. 2, and/or the machine-learned models used in methods 400, 500, and 600.

In some implementations, the one or more machine-learned models 720 can be received from the server computing system 730 over network 780, stored in the user computing device memory 714, and then used or otherwise implemented by the one or more processors 712. In some implementations, the user computing system 702 can implement multiple parallel instances of a single machine-learned model 720 (e.g., to perform parallel machine-learned model processing across multiple instances of input data and/or detected features).

More particularly, the one or more machine-learned models 720 may include one or more detection models, one or more classification models, one or more segmentation models, one or more augmentation models, one or more generative models, one or more natural language processing models, one or more optical character recognition models, and/or one or more other machine-learned models. The one or more machine-learned models 720 can include one or more transformer models. The one or more machine-learned models 720 may include one or more neural radiance field models, one or more diffusion models, and/or one or more autoregressive language models.

The one or more machine-learned models 720 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 720 can process image data, text data, audio data, and/or latent encoding data to generate output data that can include image data, text data, audio data, and/or latent encoding data. The one or more machine-learned models 720 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 740 can be included in or otherwise stored and implemented by the server computing system 730 that communicates with the user computing system 702 according to a client-server relationship. For example, the machine-learned models 740 can be implemented by the server computing system 740 as a portion of a web service (e.g., a viewfinder service, a visual search service, an image processing service, an ambient computing service, and/or an overlay application service). Thus, one or more models 720 can be stored and implemented at the user computing system 702 and/or one or more models 740 can be stored and implemented at the server computing system 730.

The user computing system 702 can also include one or more user input components 722 that receives user input (e.g., video data 102, audio data 104). For example, the user input component 722 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 724, which may be associated with one or more applications. The one or more user interfaces 724 can be configured to receive inputs and/or provide data for display (e.g., image data, text data, audio data, one or more user interface elements, an augmented-reality experience, a virtual reality experience, and/or other data for display. The user interface 724 may be associated with one or more other computing systems (e.g., server computing system 730 and/or third party computing system 750). The user interfaces 724 can include a viewfinder interface, a search interface, a generative model interface, a social media interface, and/or a media content gallery interface.

The user computing system 702 may include and/or receive data (e.g., image data 202, audio data 204) from one or more sensors 726. The one or more sensors 726 may be housed in a housing component that houses the one or more processors 712, the memory 714, and/or one or more hardware components, which may store, and/or cause to perform, one or more software packets. The one or more sensors 726 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 702 may include, and/or pe part of, a user computing device 704. The user computing device 704 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 704. For example, a camera of a smartphone may be utilized to capture image data descriptive of the environment, and/or an overlay application of the user computing device 704 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 730 includes one or more processors 732 and a memory 734. The one or more processors 732 can be any suitable processing device (e.g., a processor core, a microprocessor, an ASIC, a FPGA, a controller, a microcontroller, etc.) and can be one processor or a plurality of processors that are operatively connected. The memory 734 can include one or more non-transitory computer-readable storage mediums, such as RAM, ROM, EEPROM, EPROM, flash memory devices, magnetic disks, etc., and combinations thereof. The memory 734 can store data 736 and instructions 738 which are executed by the processor 732 to cause the server computing system 730 to perform operations.

In some implementations, the server computing system 730 includes or is otherwise implemented by one or more server computing devices. In instances in which the server computing system 730 includes plural server computing devices, such server computing devices can operate according to sequential computing architectures, parallel computing architectures, or some combination thereof.

As described above, the server computing system 730 can store or otherwise include one or more machine-learned models 740. For example, the models 740 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 740 are discussed with reference to FIG. 7B. The machine-learned models 740 can be an example of the query refinement 108 in FIG. 1, the query refinement 210 in FIG. 2, and/or the machine-learned models used in methods 400, 500, and 600.

Additionally and/or alternatively, the server computing system 730 can include and/or be communicatively connected with a search engine 742 that may be utilized to crawl one or more databases (and/or resources). The search engine 742 can process data from the user computing system 702, the server computing system 730, and/or the third party computing system 750 to determine one or more search results associated with the input data. The search engine 742 may perform term based search, label based search, Boolean based searches, image search, embedding based search (e.g., nearest neighbor search), multimodal search, and/or one or more other search techniques.

The server computing system 730 may store and/or provide one or more user interfaces 744 for obtaining input data and/or providing output data to one or more users. The one or more user interfaces 744 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 702 and/or the server computing system 730 can train the models 720 and/or 740 via interaction with the third party computing system 750 that is communicatively coupled over the network 780. The third party computing system 750 can be separate from the server computing system 730 or can be a portion of the server computing system 730. Alternatively and/or additionally, the third party computing system 750 may be associated with one or more web resources, one or more web platforms, one or more other users, and/or one or more contexts.

The third party computing system 750 can include one or more processors 752 and a memory 754. The one or more processors 752 can be any suitable processing device (e.g., a processor core, a microprocessor, an ASIC, a FPGA, a controller, a microcontroller, etc.) and can be one processor or a plurality of processors that are operatively connected. The memory 754 can include one or more non-transitory computer-readable storage mediums, such as RAM, ROM, EEPROM, EPROM, flash memory devices, magnetic disks, etc., and combinations thereof. The memory 754 can store data 756 and instructions 758 which are executed by the processor 752 to cause the third party computing system 750 to perform operations. In some implementations, the third party computing system 750 includes or is otherwise implemented by one or more server computing devices.

The network 780 can be any type of communications network, such as a local area network (e.g., intranet), wide area network (e.g., Internet), or some combination thereof and can include any number of wired or wireless links. In general, communication over the network 780 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data (e.g., image data 202). The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data (e.g., audio data 204). The machine-learned model(s)

can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data (e.g., image data 202, audio data 204). The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data (e.g., image data 202) and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 702 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 700.

The central intelligence layer can communicate with a central device data layer. The central device data layer can be a centralized repository of data for the computing system 700. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 7B:
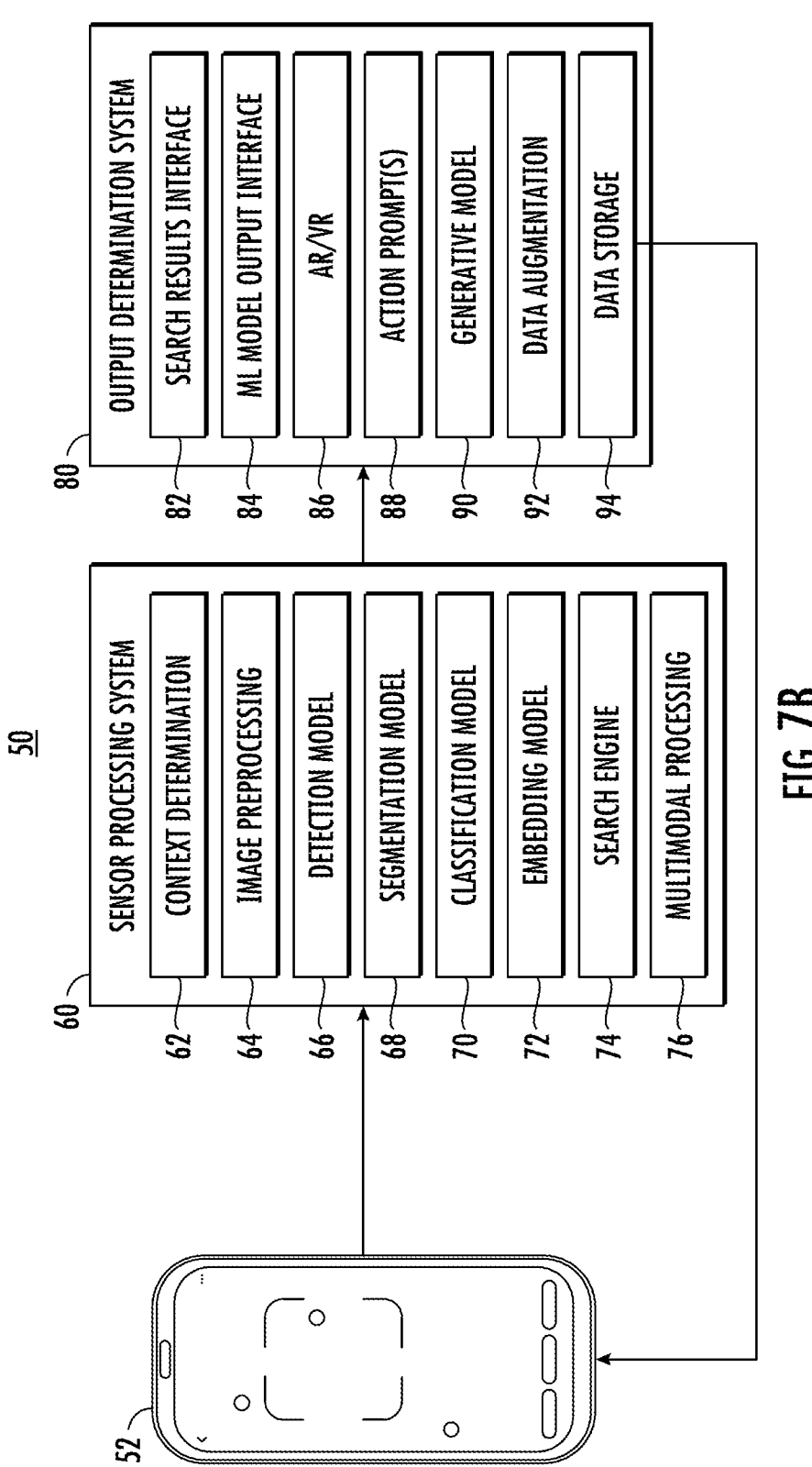
FIG. 7B depicts a block diagram of an example computing system that performs a multimodal search according to example embodiments of the present disclosure.

FIG. 7B depicts a block diagram of an example computing system 50 that performs a multimodal search according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interaction with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings (e.g., text embeddings 112, image embeddings 114). For example, one or more images can be processed with the one or more embedding models 72 to generate one or more image embeddings (e.g., image embeddings 114) in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to provide user interface elements may condition and/or affect successive processing loops.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer-implemented method for multimodal searching of video results, the method comprising:

receiving, by a computing system comprising one or more processors, video data captured by a camera of a user device, the video data having a sequence of image frames;

receiving audio data associated with the video data captured by the user device;

processing, using one or more machine-learned models, the sequence of image frames to generate video embeddings related to the sequence of the image frames, the video embeddings having a plurality of image embeddings associated with the sequence of image frames;

determining one or more video results based on the video embeddings and the audio data;

determining one or more web results based on the video embeddings; and transmitting, to the user device, the one or more video results and the one or more web results.

2. The method of claim 1, further comprising:

processing, using the one or more machine-learned models, the sequence of image frames to generate temporal information related to the sequence of the image frames; and wherein the determination of the one or more video results is further based on the temporal information related to the sequence of the image frames.

3. The method of claim 1, further comprising:

processing, using an automatic speech recognition technique, the audio data to generate a text query; and wherein the determination of the one or more video results is further based on the text query.

4. The method of claim 1, wherein the processing of the sequence of image frames to generate the video embeddings comprises:

selecting, using a frame selection algorithm, a subset of image frames from the sequence of image frames;

processing each image frame in the subset of image frames to generate a plurality of image embeddings, the plurality of image embeddings having an image embedding for each image frame in the subset of image frames; and determining the video embeddings based on the plurality of image embeddings.

5. The method of claim 4, wherein the video embeddings are determined by averaging each image embedding in the plurality of image embeddings.

6. The method of claim 4, wherein the frame selection algorithm is a uniform random sampling of frames, wherein the subset of image frames is selected at a regular interval.

7. The method of claim 4, wherein the frame selection algorithm is based on a position of the camera and an orientation of the camera.

8. The method of claim 4, the method further comprising:

detecting a target object in the video data; and wherein the frame selection algorithm is based on a spatial relationship between the camera and the target object.

9. The method of claim 8, wherein the spatial relationship includes a translation vector that represents a position of the camera in a three-dimensional space relative to the target object, the translation vector specifying a distance that the camera is displaced with respect to the target object.

10. The method of claim 8, wherein the spatial relationship includes a rotation matrix that represents an orientation of the camera in a three-dimensional space relative to the target object, the orientation matrix specifying a degree of rotation of the camera with respect to the target object.

11. The method of claim 4, wherein the frame selection algorithm is running on the user device and the video data received is a subset of images from the sequence of image frames, and wherein the video embeddings are generated by processing the subset of image frames, the video embeddings having temporal information associated with the subset of image frames.

12. The method of claim 1, the method further comprising:

processing the audio data to generate an input audio signature; and wherein the determination of the one or more video results is further based on the input audio signature.

13. The method of claim 12, wherein the determination of the one or more search results comprises:

detecting a target object in the video data;

accessing, from an audio signature database a plurality of known audio signatures that are associated with the target object;

selecting a matching audio signature from the known audio signatures, wherein a comparison score of the matching audio signature exceeds a threshold value, the matching score of the matching audio signature being calculated by comparing the input audio signature with the matching audio signature; and wherein the one or more video results are further determined based on the matching audio signature.

14. The method of claim 1, wherein the processing of the sequence of image frames to generate the video embeddings comprises:

processing, using the one or more machine-learned model, each image frame in the sequence of image frames to generate the video embeddings;

mapping the generated video embeddings to an index of video embeddings; and wherein the one or more video results are determined based on the mapping of the generated video embeddings to the index of video embeddings.

15. The method of claim 14, wherein the mapping of the generated video embeddings to the index of video embeddings comprises:

ranking each video embedding in the index of video embeddings based on a comparison with the generated video embeddings, each video embedding being associated with a video result; and wherein the one or more video results are determined based on the ranking of each video embedding in the index of video embeddings.

16. The method of claim 1, where the one or more machine-learned model includes a polymath model that is trained using tutorial videos publicly available on an online video sharing platform or a multimodal multitask unified model that is trained to understand information from a plurality of formats, the plurality of formats including video and text.

17. The method of claim 1, further comprising:

processing, using the one or more machine-learned models, the audio data with the sequence of image frames to generate video embeddings.

18. A computer-implemented method for multimodal searching of video results, the method comprising:

capturing, by a camera of a user device, video data having a sequence of image frames;

capturing, by a microphone of the user device, audio data associated with the video data;

processing, using one or more machine-learned models stored on the user device, the audio data and the sequence of image frames to generate video embeddings, the video embeddings being derived by processing the video data concurrently with the audio data;

transmitting, to a server, the video embeddings;

in response to the transmission of the video embeddings and the audio data, receiving one or more video results and one or more web results from the server;

presenting, on a display of the user device, the one or more video results and the one or more web results.

19. A computing system, the system comprising:

one or more processors; and one or more non-transitory computer-readable media that collectively store instructions that, when executed by the one or more processors, cause the computing system to perform operations, the operations comprising:

receiving, by a computing system comprising one or more processors, video data captured by a camera of a user device, the video data having a sequence of image frames;

receiving audio data associated with the video data captured by the user device;

processing, using one or more machine-learned models, the sequence of image frames to generate video embeddings related to the sequence of the image frames, the video embeddings having a plurality of image embeddings associated with the sequence of image frames;

determining one or more video results based on the video embeddings and the audio data;

determining one or more web results based on the video embeddings; and transmitting, to the user device, the one or more video results and the one or more web results.

20. A computer-implemented method for multimodal searching of video results, the method comprising:

receiving, by a computing system comprising one or more processors, video data captured by a camera of a user device, the video data having a sequence of image frames;

receiving audio data associated with the video data captured by the user device;

detecting a target object in the video data;

selecting, using a frame selection algorithm, a subset of image frames from the sequence of image frames, wherein the frame selection algorithm is based on a spatial relationship between the camera and the target object;

processing the subset of image frames to generate a plurality of image embeddings;

processing, using one or more machine-learned models, the plurality of image embeddings to generate video embeddings related to the sequence of the image frames, the video embeddings having a plurality of image embeddings associated with the sequence of image frames;

determining one or more video results based on the video embeddings and the audio data; and transmitting, to the user device, the one or more video results.

21. A computer-implemented method for multimodal searching of video results, the method comprising:

receiving, by a computing system comprising one or more processors, video data captured by a camera of a user device, the video data having a sequence of image frames;

receiving audio data associated with the video data captured by the user device;

selecting, using a frame selection algorithm, a subset of image frames from the sequence of image frames, wherein the frame selection algorithm is based on a position of the camera and an orientation of the camera;

processing the subset of image frames to generate a plurality of image embeddings;

processing, using one or more machine-learned models, the plurality of image embeddings to generate video embeddings related to the sequence of the image frames, the video embeddings having a plurality of image embeddings associated with the sequence of image frames;

determining one or more video results based on the video embeddings and the audio data; and transmitting, to the user device, the one or more video results.

22. A computer-implemented method for multimodal searching of video results, the method comprising:

receiving, by a computing system comprising one or more processors, video data captured by a camera of a user device, the video data having a sequence of image frames;

receiving audio data associated with the video data captured by the user device;

selecting, using a frame selection algorithm, a subset of image frames from the sequence of image frames;

processing each image frame in the subset of image frames to generate a plurality of image embeddings, the plurality of image embeddings having an image embedding for each image frame in the subset of image frames;

determining the video embeddings based on the plurality of image embeddings, wherein the video embeddings are determined by averaging each image embedding in the plurality of image embeddings, and wherein the video embeddings having a plurality of image embeddings associated with the sequence of image frames;

determining one or more video results based on the video embeddings and the audio data; and transmitting, to the user device, the one or more video results.

23. A computer-implemented method for multimodal searching of video results, the method comprising:

receiving, by a computing system comprising one or more processors, video data captured by a camera of a user device, the video data having a sequence of image frames;

receiving audio data associated with the video data captured by the user device;

processing, using one or more machine-learned models, the sequence of image frames to generate video embeddings related to the sequence of the image frames by:

processing, using the one or more machine-learned model, each image frame in the sequence of image frames to generate the video embeddings, the video embeddings having a plurality of image embeddings associated with the sequence of image frames; and mapping the generated video embeddings to an index of video embeddings;

determining one or more video results based on the video embeddings and the audio data, wherein the one or more video results are determined based on the mapping of the generated video embeddings to the index of video embeddings; and transmitting, to the user device, the one or more video results.

24. A computer-implemented method for multimodal searching of video results, the method comprising:

receiving, by a computing system comprising one or more processors, video data captured by a camera of a user device, the video data having a sequence of image frames;

receiving audio data associated with the video data captured by the user device;

processing, using one or more machine-learned models, the sequence of image frames to generate video embeddings related to the sequence of the image frames, the video embeddings having a plurality of image embeddings associated with the sequence of image frames, wherein the one or more machine-learned model includes a polymath model that is trained using tutorial videos publicly available on an online video sharing platform or a multimodal multitask unified model that is trained to understand information from a plurality of formats, the plurality of formats including video and text;

determining one or more video results based on the video embeddings and the audio data; and transmitting, to the user device, the one or more video results.

* * * * *